(12) United States Patent
Tiffin et al.

(10) Patent No.: US 11,709,367 B2
(45) Date of Patent: Jul. 25, 2023

(54) SYSTEMS AND DEVICES FOR CONTROLLING CAMERA PRIVACY IN WEARABLE DEVICES

(71) Applicant: GOOGLE LLC, Mountain View, CA (US)

(72) Inventors: Joshua Tiffin, Waterloo (CA); Joshua Moore, Elora (CA); Adam Carvalho, Cambridge (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/895,622

(22) Filed: Aug. 25, 2022

(65) Prior Publication Data

US 2022/0413305 A1    Dec. 29, 2022

Related U.S. Application Data

(63) Continuation of application No. 16/951,491, filed on Nov. 18, 2020, now Pat. No. 11,442,281.

(60) Provisional application No. 62/936,803, filed on Nov. 18, 2019.

(51) Int. Cl.
| | |
|---|---|
| *G09G 5/00* | (2006.01) |
| *G02B 27/01* | (2006.01) |
| *H04N 13/344* | (2018.01) |
| *G03B 17/56* | (2021.01) |
| *G03B 17/02* | (2021.01) |
| *H04N 23/51* | (2023.01) |

(52) U.S. Cl.
CPC ..... *G02B 27/0176* (2013.01); *G02B 27/0172* (2013.01); *G03B 17/02* (2013.01); *G03B 17/561* (2013.01); *H04N 13/344* (2018.05); *H04N 23/51* (2023.01); *G02B 2027/0134* (2013.01); *G02B 2027/0138* (2013.01); *G02B 2027/0154* (2013.01); *G02B 2027/0178* (2013.01)

(58) Field of Classification Search
CPC ............ G02B 27/0176; G02B 27/0172; H04N 13/344; G03B 17/02
USPC .......................................................... 345/8
See application file for complete search history.

(56) References Cited

U.S. PATENT DOCUMENTS

| | | | | |
|---|---|---|---|---|
| 2007/0269202 | A1* | 11/2007 | Forsyth-Martinez | ....................... G03B 17/00 396/448 |
| 2007/0291213 | A1* | 12/2007 | Chen | ................. G02F 1/133707 349/143 |
| 2013/0163083 | A1* | 6/2013 | Cheng | .................... G02B 23/16 359/511 |
| 2014/0168480 | A1* | 6/2014 | Okazawa | ........... H04N 5/36961 348/241 |
| 2014/0333831 | A1* | 11/2014 | Oh | ....................... G03B 11/041 348/376 |

(Continued)

*Primary Examiner* — Jonathan M Blancha

(57) ABSTRACT

Systems and devices for controlling camera privacy in wearable devices are described. A camera cover can be provided that is movable between a closed position and an open position. In the closed position, the camera cover can occlude a field of view of a camera, such that the camera cannot capture meaningful data. In the open position, the camera cover can be at least partially out of the field of view of the camera, such that the camera can capture meaningful data. The camera cover can be positioned within a housing of the wearable device, and an actuator can be positioned external to the housing of the wearable device. A user can move the camera cover by moving the actuator.

20 Claims, 21 Drawing Sheets

(56) References Cited

U.S. PATENT DOCUMENTS

2015/0169047 A1* 6/2015 Reponen ................. G06F 3/005
  345/156
2016/0147091 A1* 5/2016 Christmann ............. G03B 9/02
  250/225

* cited by examiner

SYSTEMS AND DEVICES FOR CONTROLLING CAMERA PRIVACY IN WEARABLE DEVICES

CROSS-REFERENCE TO RELATED APPLICATIONS

The present application is a continuation application of U.S. patent application Ser. No. 16/951,491, entitled "SYSTEMS AND DEVICES FOR CONTROLLING CAMERA PRIVACY IN WEARABLE DEVICES" and filed on Nov. 18, 2020, which claims priority to U.S. Provisional Application No. 62/936,803, titled "Methods, Devices, and Systems for Interactive Cloud Gaming," filed Nov. 18, 2019, all of which are hereby incorporated by reference herein in their entirety.

BACKGROUND

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be "wireless" (i.e., designed to operate without any wire-connections to other, non-portable electronic systems); however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Because they are worn on the body of the user, and typically visible to others, and generally present for long periods of time, form factor (i.e., size, geometry, and appearance) is a major design consideration in wearable electronic devices.

Wearable devices can include head-mounted wearable devices, which are devices to be worn on a user's head when in use. Wearable head-mounted devices can include head-mounted displays and can also include head-mounted devices which do not include displays.

A head-mounted display is an electronic device that is worn on a user's head and, when so worn, secures at least one electronic display within a viewable field of at least one of the user's eyes. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Microsoft Hololens® just to name a few.

A head-mounted device which does not include a display can include other components, such as a camera, microphone, and/or speakers. Examples of head-mounted devices which do not include a display include: the Snap Inc. Spectacles®, and the Bose Frames®, to name a couple.

Wearable devices can include at least one camera, which can be used for applications like capturing photographs, as well as for applications like computer vision, where at least one image captured by a camera is analyzed by at least one processor. Head-mounted wearable devices in particular benefit from the inclusion of at least one camera, since these devices are worn on a user's head and the at least one camera can be positioned and oriented to capture data which approximates a user's field of view. However, other wearable devices, such as smartwatches for example, could include at least one camera.

The inclusion of a camera in wearable devices can raise privacy concerns. In particular, enabling wearable devices to discreetly capture images can lead to socially and/or legally unacceptable actions. Examples of such actions can include capturing comprising data of other people (e.g. voyeurism), and capturing data of secrets (e.g. espionage). Such actions can be deliberate on the part of the user, or could be unintentional on the part of the user, such as if the wearable device includes computer vision applications which run autonomously.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
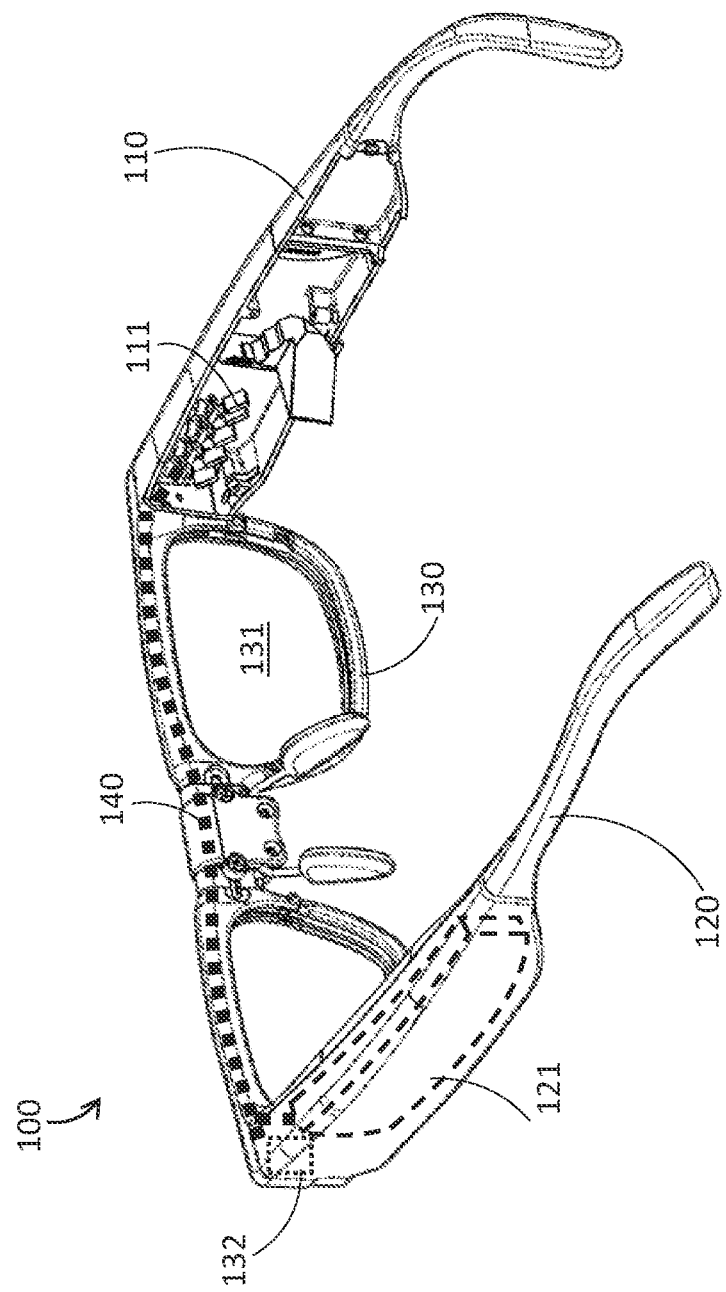
FIG. 1 is a partial-cutaway perspective view of an exemplary wearable device in accordance with the present systems and devices.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems and devices for controlling camera privacy in wearable devices.

As described herein, in some cases it is desirable for wearable devices to make bystanders aware when data is being captured by a camera. Additionally, it is desirable for bystanders to feel comfortable knowing when data is NOT being captured by a camera. If a wearable device includes a visible camera, bystanders may be unsure whether or not data is being captured, even if the camera is not active. Further, it is desirable to provide a means to deactivate, occlude, or otherwise disable use of a camera of a wearable device to prevent the occurrence of unacceptable actions.

Described herein are techniques and systems for wearable devices to indicate when data is, and when data is not, being captured by a camera. In some embodiments, a wearable device includes: a support structure to be worn by a user; a camera carried by the support structure; a camera cover carried by the support structure, the camera cover movable between a closed position and an open position, wherein in the closed position the camera cover occludes a field of view of the camera, and in the open position the camera cover is at least partially out of the field of view of the camera; and an actuator coupled to the camera cover to move the camera cover between the closed position and the open position.

The wearable device may further include a first member, the actuator coupled to the camera cover via the first member. The camera cover may be rotatable about a pivot positioned on the first member, the closed position of the camera cover may correspond to an angular position of the camera cover where the camera cover occludes the field of view of the camera, and the open position of the camera cover may correspond to an angular position of the camera cover where the camera cover is at least partially out of the field of view of the camera. The actuator may be directly coupled to the first member. The wearable device may further include a second member which couples the actuator to the first member. The camera cover and the first member may be an integrated component.

The actuator may be a sliding actuator slidable along a first axis between a first position and a second position, wherein in the first position the actuator holds the camera cover in the closed position, and in the second position the actuator holds the camera cover in the open position. The wearable device may further include a cam to translate the camera cover in a direction non-parallel to the first axis when the actuator transitions between the first position and the second position.

The wearable device may further include a bias member which biases the camera cover towards either the closed position or the open position.

The wearable device may further include at least one restrain member which limits a range of motion of the camera cover to between the closed position and the open position.

The support structure may include a housing, the camera and the camera cover may be positioned within the housing, and the actuator may be positioned external to the housing. The housing may be waterproof. The camera cover may be visible from outside the housing when the camera cover is in the closed position.

The actuator may be magnetically coupled to the camera cover. The actuator may be mechanically coupled to the camera cover.

The actuator may include a mechanical actuator which is operated by mechanical force applied by a user.

The actuator may include a motor. The support structure may include a housing, wherein the camera, the camera cover, and the actuator are positioned within the housing.

The actuator may be flush with a surface of the support structure. The actuator may project outside of a surface of the support structure. The actuator may be sunken into a surface of the support structure.

The support structure may include: a first arm to be positioned on a first side of head of a user; a second arm to be positioned on a second side of the head of the user opposite the first side; and a front frame coupled to the first arm and the second arm, the front frame to be positioned on a front of the head of the user. The camera, the camera cover, and the actuator may be carried by the front frame. The actuator may be positioned on a user-side of the front frame. The actuator may be positioned on a top of the front frame.

The camera cover may be visible from a world-side of the front frame when the camera cover is in the closed position, and the camera may be visible from a world-side of the front frame when the camera cover is in the open position.

The wearable device may further include a detection circuit to determine whether the camera cover is in the closed position or the open position.

The actuator may be magnetically coupled to the camera cover, and the wearable device may further include a magnet sensor to determine whether the camera cover is in the closed position or the open position.

FIG. 1 is a partial-cutaway perspective view of an exemplary wearable device 100 in accordance with the present systems and devices. Wearable device 100 includes a first arm 110, a second arm 120, and a front frame 130 which is physically coupled to first arm 110 and second arm 120. When worn by a user, first arm 110 is to be positioned on a first side of a head of the user, second arm 120 is to be positioned on a second side of a head of a user opposite the first side of the head of the user, and front frame 130 is to be positioned on a front side of the head of a user. First arm 110 optionally carries a light engine assembly 111 which outputs light representative of display content to be viewed by a user. First arm 110 may also optionally carry several additional components of wearable device 100, such as at least one processor, at least one non-transitory processor-readable storage medium, or a power supply circuit, for example. Front frame 130 optionally carries an optical combiner 131 in a field of view of the user which receives light output from the light engine assembly 111 and redirects this light to form a display to be viewed by the user. In the case of FIG. 1, the display will be a monocular display visible to a right eye of a user. Second arm 120 as shown in FIG. 1 carries a power source 121 which powers the components of wearable device 100. Front frame 130 also carries a camera 132. Front frame 130 also carries at least one set of electrically conductive current paths 140 which provide electrical coupling between power source 121 and light engine 111, and any other electrical components carried by first arm 110. The at least one set of electrically conductive current paths 140 can also provide electrical coupling between camera 132 and other components of wearable device 100, including power source 121 and/or at least one processor carried by wearable device 100.

"Power source" as used herein can refer to a component which provides electrical power. This could include for example a source of stored power such as a battery, including a chemical battery or a mechanical battery, or could include power generation systems such as piezoelectric elements, solar cells, or similar. A "set of electrically conductive current paths" as used herein can refer to a single electrically conductive current path, such as a wire or conductive trace on a printed circuit board, as well as a plurality of electrically conductive current paths, such as a plurality of wires or a plurality of conductive traces on a printed circuit board. Further, for a set of electrically conductive current paths to provide electrical coupling, at least one current path in the set can provide the coupling. It is possible, but not necessary, that a plurality or all of the electrically conductive current paths in the set provide the coupling. Further, for one set of electrically conductive current paths to provide electrical coupling to another set of electrically conductive current paths, at least one current path in the one set should couple to at least one current path in the other set. It is possible, but not necessary, for each electrically conductive current path in the one set to couple to a respective electrically conductive current path in the other set. It is also possible that either of the sets of electrically conductive current paths could act as fan-in or fan-out paths, in which the number of conductors in one set of electrically conductive current paths is greater or less than the number of conductors in the other set of electrically conductive current paths.

Detailed implementations of how such a monocular arrangement can be implemented are discussed in for example U.S. Provisional Patent Application No. 62/862, 355. However, such an arrangement is merely exemplary. As another example, the orientation of wearable device 100 could be reversed, such that the display is presented to a left eye of a user instead of the right eye. As another example, second arm 120 could carry a light engine assembly similar to light engine assembly 111 carried by first arm 110, and front frame 130 could also carry an optical combiner similar to optical combiner 131, such that wearable device 100 presents a binocular display to both a right eye and a left eye of a user. As another example, wearable device 100 may not include a light engine or optical combiner at all, such that wearable device 100 is a wearable device which does not include a display.

Light engine assembly 111 and optical combiner 131 can include any appropriate display architecture for outputting light and redirecting the light to form a display to be viewed by a user. For example, light engine 111, and any of the light engines discussed herein, could include at least one component selected from a group including at least: one of a projector, a scanning laser projector, a microdisplay, a white-light source, or any other display technology as appropriate for a given application. Optical combiner 131, and any of the optical combiners discussed herein, could include at least one optical component selected from a group including at least: a waveguide, at least one holographic optical element, at least one prism, a diffraction grating, at least one light reflector, a light reflector array, at least one light refractor, a light refractor array, or any other light-redirection technology as appropriate for a given application, positioned and oriented to redirect the display light towards the eye of the user. Optical combiner 131 can be carried by a lens, and the lens can be carried by front frame 130. For example, optical combiner 131 could be: a layer formed as part of a lens, a layer adhered to a lens, a layer embedded within a lens, a layer sandwiched between at least two lenses, or any other appropriate arrangement. A layer can for example be molded or cast, and/or could include a thin film and/or coating. Alternatively, optical combiner 131 could be a lens carried by front frame 130. Further, a "lens" as used herein can refer to a plano lens which applies no optical power and does not correct a user's vision, or a "lens" can be a prescription lens which applies an optical power to incoming light to correct a user's vision.

Exemplary display architectures could include for example scanning laser projector and holographic optical element combinations, side-illuminated optical waveguide displays, pin-light displays, or any other wearable heads-up display technology as appropriate for a given application. Exemplary display architectures are described in at least U.S. patent application Ser. No. 16/025,820, U.S. patent application Ser. No. 15/145,576, U.S. patent application Ser. No. 15/807,856, U.S. Provisional Patent Application No. 62/754,339, U.S. Provisional Patent Application Ser. No. 62/782,918, U.S. Provisional Patent Application Ser. No. 62/789,908, U.S. Provisional Patent Application Ser. No. 62/845,956, and U.S. Provisional Patent Application Ser. No. 62/791,514.

The term "light engine" as used herein is not limited to referring to a singular light source, but can also refer to a plurality of light sources, and can also refer to a "light engine assembly". A light engine assembly may include some components which enable the light engine to function, or which improve operation of the light engine. As one example, a light engine assembly could include at least one light source, such as a laser or a plurality of lasers. The light engine assembly may additionally include electrical components such as driver circuitry to power the at least one light source. The light engine assembly may additionally include optical components such as collimation lenses, a beam combiner, or beam shaping optics. The light engine assembly may additionally include beam redirection optics such as least one MEMS mirror, which can be operated to scan light from at least one laser light source such as in a scanning laser projector. In the above example, the light engine assembly includes not only a light source, but also components which take the output from at least one light source and produce conditioned display light. All of the components in the light engine assembly can be included in a housing of the light engine assembly, could be affixed to a substrate of the light engine assembly such as a printed circuit board or similar, or could be separately mounted components of a wearable device.

The term "optical combiner" as used herein can also refer to an "optical combiner assembly". An optical combiner assembly may include additional components which support or enable functionality of the optical combiner. As one example, a waveguide combiner may be very thin, and consequently very fragile. To this end, it may be desirable to position the waveguide combiner within or on a transparent carrier, such as a lens. An optical combiner assembly could be a package which includes the transparent carrier and the waveguide positioned therein or thereon. As another example, an optical combiner assembly could include a prescription component, which applies an optical power to incoming light to compensate for imperfect user eyesight. Such a prescription component could include curvature applied to a transparent carrier itself, or could include a component additional to the transparent carrier, such as a clip-in or add-on lens.

Several exemplary wearable devices are described below, which further illustrate various features of the present systems and devices. One skilled in the art will appreciate that the specific features described in the below implementations can be combined as appropriate, such that the present disclosure is not restricted to only the implementations discussed below, but also includes any reasonable combination of the features of the implementations discussed herein.

Figure 2:
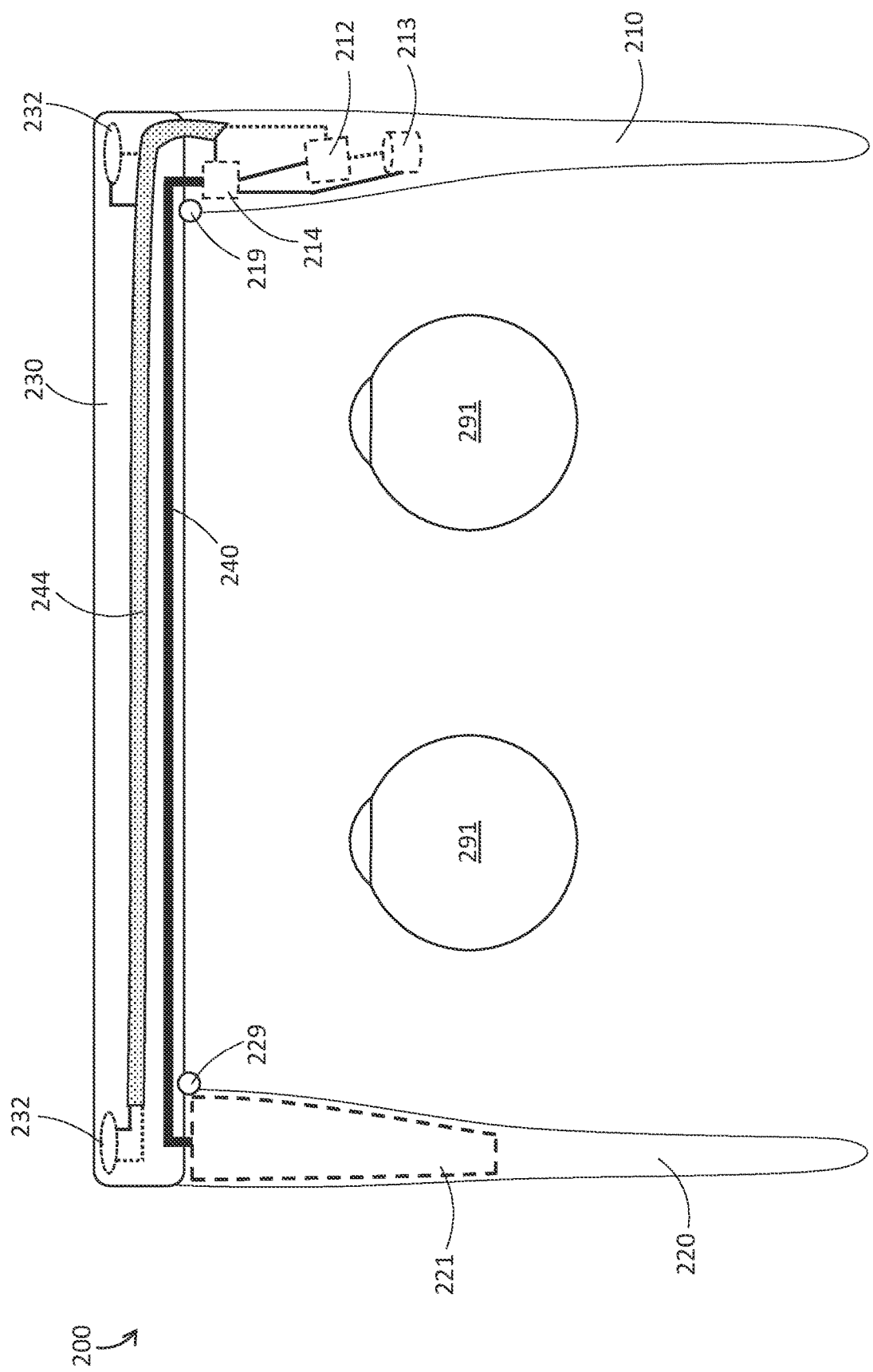
FIG. 2 is a top cutaway view of an exemplary wearable device in accordance with the present systems and devices.

FIG. 2 is a top cutaway view of an exemplary wearable device 200 in accordance with the present systems and devices. Similar to wearable device 100, wearable device 200 includes a first arm 210, a second arm 220, and a front frame 230. First arm 210 is coupled to front frame 230 by hinge 219, which allows first arm 210 to rotate relative to front frame 230. Second arm 220 is coupled to front frame 230 by hinge 229, which allows second arm 220 to rotate relative to front frame 230. FIG. 2 illustrates wearable device 200 in an unfolded configuration, in which first arm 210 and second arm 220 are rotated such that wearable device 200 can be worn on a head of a user, with first arm 210 positioned on a first side of the head of the user, second arm 220 positioned on a second side of the head of the user opposite the first side, and front frame 230 positioned on a front of the head of the user. Both first arm 210 and second arm 220 can be folded to be approximately parallel to front frame 230, such that wearable device 200 will be in a compact shape which fits conveniently in a slim rectangular, cylindrical, or oblong case.

Alternatively, first arm 210 and second arm 220 could be rigidly coupled to front frame 230, such that wearable device 200 does not transition between a folded configuration and an unfolded configuration.

Figure 3A:
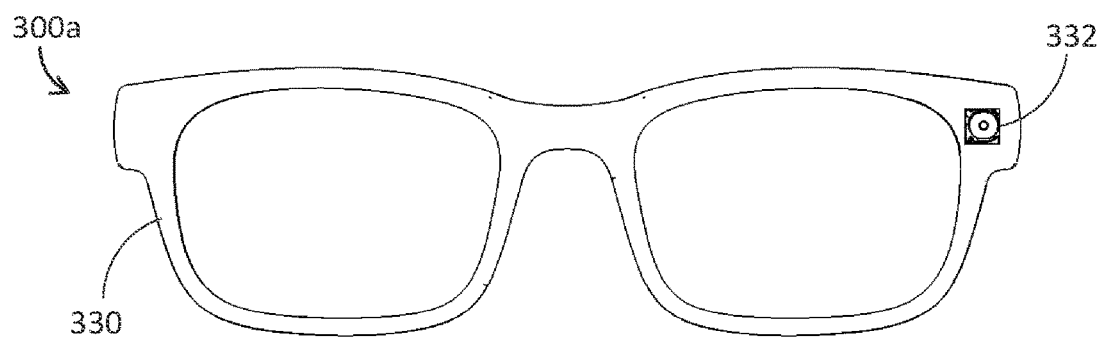
FIGS. 3A, 3B, and 3C, are respective front views of exemplary wearable devices, illustrating exemplary camera positions in accordance with at least implementations of the present systems and devices.
Figure 3B:
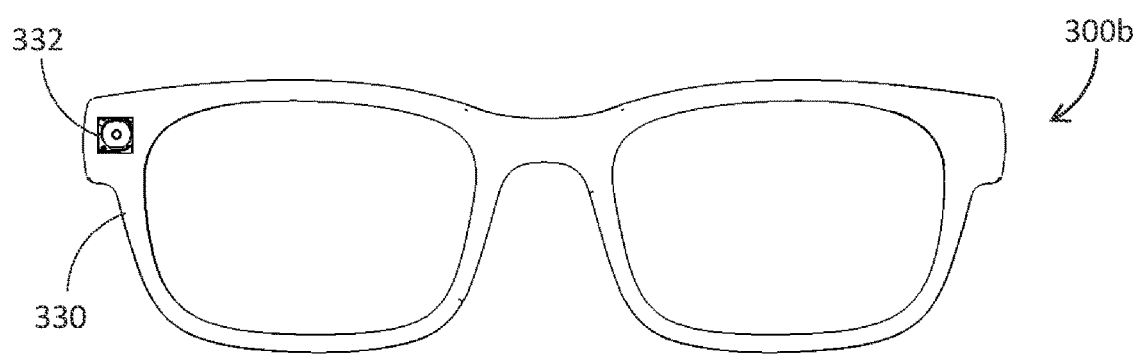
Figure 3C:
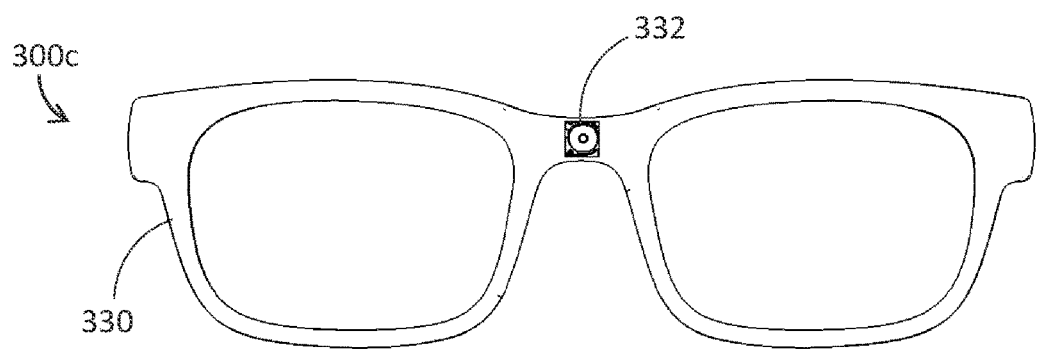

First arm 210 can carry at least one processor 212, non-transitory processor-readable storage medium 213, and power supply circuit 214. Second arm 220 can carry power source 221. Front frame 230 can carry at least one camera 232. FIG. 2 illustrates two cameras 232 on opposite ends of front frame 230, but one skilled in the art will appreciate that the exact number of cameras, and the specific position of the cameras, could be chosen as appropriate for a given wearable device design. For example, wearable device 200 could include only a single camera, or could include two, three, four, five, six, or more cameras. FIGS. 3A, 3B, and 3C illustrate several exemplary camera positions. Further, although the at least one camera 232 is shown as being carried by front frame, at least one of cameras 232 could be carried by first arm 210 or second arm 220.

FIG. 2 does not illustrate wearable device 200 as including a light engine or display optics. Wearable device 200 could be a device which does not include such a light engine or display optics, or wearable device 200 could include any appropriate display architecture, such as those described in U.S. patent application Ser. No. 16/025,820, U.S. patent application Ser. No. 15/145,576, U.S. patent application Ser. No. 15/807,856, U.S. Provisional Patent Application No. 62/754,339, U.S. Provisional Patent Application Ser. No. 62/782,918, U.S. Provisional Patent Application Ser. No. 62/789,908, U.S. Provisional Patent Application Ser. No. 62/845,956, and U.S. Provisional Patent Application Ser. No. 62/791,514.

Wearable device 200 can include at least one set of electrically conductive current paths 240. The set of electrically conductive current paths 240 can provide electrical coupling between power source 221 in second arm 220 and electrical components in first arm 210, either directly or indirectly through power supply circuit 214. Detailed implementations of electrically conductive current paths are described in at least U.S. Provisional Patent Application No. 62/862,355.

Power supply circuit 214 provides power from power source 221 to at least one processor 212 and non-transitory processor-readable storage medium 213, and any other electrical components that may be carried by first arm 210, as shown by solid lines connecting power supply circuit 214 to other components. Power supply circuit 214 can optionally modulate the power from power source 221, such as by modulating the voltage or current of the power to be delivered to each of the electrical components. Each electrical component may receive the same modulated power signal from power supply circuit 214, each component may receive a different modulated power signal from power supply circuit 214, or some components may receive the same modulated power signal from power supply circuit 214 while other components receive a different modulated power signal from power supply circuit 214.

The at least one processor 212 can be communicatively coupled to each of the electrical components in wearable device 200 as shown by dashed lines connecting components, including but not limited to non-transitory processor readable storage medium 213 and power supply circuit 214. The at least one processor 212 can be any suitable component which can execute instructions or logic, including but not limited to a micro-controller, microprocessor, multi-core processor, integrated-circuit, ASIC, FPGA, programmable logic device, or any appropriate combination of these components. Non-transitory processor-readable storage medium 213 may store processor readable instructions thereon, which when executed by at least one processor 212 can cause the at least one processor to execute any number of functions, including receiving user input, managing user interfaces, generating display content to be presented to a user, receiving and managing data from any sensors carried by wearable device 200, receiving and processing external data and messages, and/or any other functions as appropriate for a given application. The non-transitory processor-readable storage medium 213 can be any suitable component which can store instructions, logic, or programs, including but not limited to non-volatile or volatile memory, read only memory (ROM), random access memory (RAM), FLASH memory, registers, magnetic hard disk, optical disk, or any combination of these components.

The terms "carry", "carries" or similar used herein do not necessarily dictate that one component physically supports another component. For example, components "carried by" first arm 210 could be mounted to or within first arm 210 such that first arm 210 physically supports said components. However, the term "carry" could also describe a direct or indirect coupling relationship, even when first arm 210 is not necessarily physically supporting components. As an example, in some implementations such as those disclosed in U.S. Provisional Patent Application No. 62/890,269, a hinge of a wearable device can support both an arm of the wearable device and components in the arm of the wearable device, with no direct supporting relationship between the components and the arm. This can be true of any of the component relationships described herein where one component "carries" another.

Wearable display 200 can include a set of electrically conductive current paths 244 coupled to the at least one camera 232. As shown by solid lines in FIG. 2, the set of electrically conductive current paths 244 can also extend between power supply circuit 214 and camera 232 to provide power to the camera 232. Further, as shown by dashed lines, the set of electrically conductive current paths 244 can also extend between the at least one processor 212 and camera 232, so that the at least one processor 212 can control camera 232, and so that camera 232 can provide captured visual data to the at least one processor 212. Since the set of electrically conductive current paths 244 can act as a transmission medium for both power and data, the set of electrically conductive current paths 244 can include at least two conductors, one for power, and one for data. For example, the set of electrically conductive current paths 244 could include a flexible printed circuit board including at least two conductive traces. Alternatively, the set of electrically conductive current paths 244 could include at least two separate wires. Detailed implementations of current paths connected to cameras can be found in at least U.S. Provisional Patent Application No. 62/862,355.

FIGS. 3A, 3B, and 3C are respective front views which illustrate exemplary camera positions for wearable devices described herein. FIGS. 3A, 3B, and 3C are front views in that a front frame 330 of each of the wearable devices is illustrated as would be seen by a bystander looking at the front of the wearable devices. Front frame 330 in each of FIGS. 3A, 3B, and 3C can be similar to front frame 130 in FIG. 1 and front frame 230 illustrated in FIG. 2.

FIG. 3A illustrates a wearable device 300a which includes a camera 332 positioned at an upper-right corner of front frame 330 as seen by a bystander (upper-left corner from a perspective of a user), proximal to where an arm would couple to front frame 330, such as second arm 120 illustrated in FIG. 1 or second arm 220 illustrated in FIG. 2.

FIG. 3B illustrates a wearable device 300b which includes a camera 332 positioned at an upper-left corner of front frame 330 as seen by a bystander (upper-right corner from a perspective of a user), proximal to where an arm would couple to front frame 330, such as first arm 110 illustrated in FIG. 1 or first arm 210 illustrated in FIG. 2.

FIG. 3C illustrates a wearable device 300c which includes a camera 332 positioned on nose-bridge of front frame 330.

FIGS. 3A, 3B, and 3C illustrate three exemplary camera positions on a wearable device. However, any camera position is within the scope of the present disclosure, as appropriate for a given application. Further, when multiple cameras are included in a single wearable device, said cameras can be implemented in a plurality of positions. As an example, FIG. 2 illustrates two cameras 232 included in a wearable device 200, one of said cameras 232 positioned in the position shown in FIG. 3A, and another of said cameras 232 positioned in the position shown in FIG. 3B.

Figure 4A:
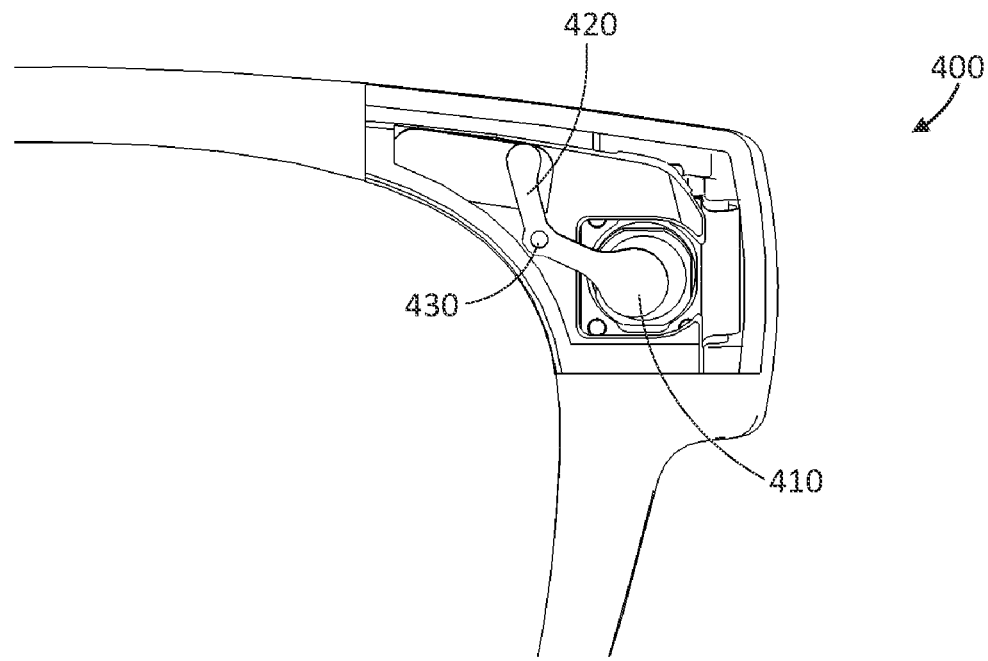
FIGS. 4A and 4B are respective front partial cutaway views of a camera privacy system implemented in a wearable device, in accordance with at least one implementation of the present systems and devices.
Figure 4B:
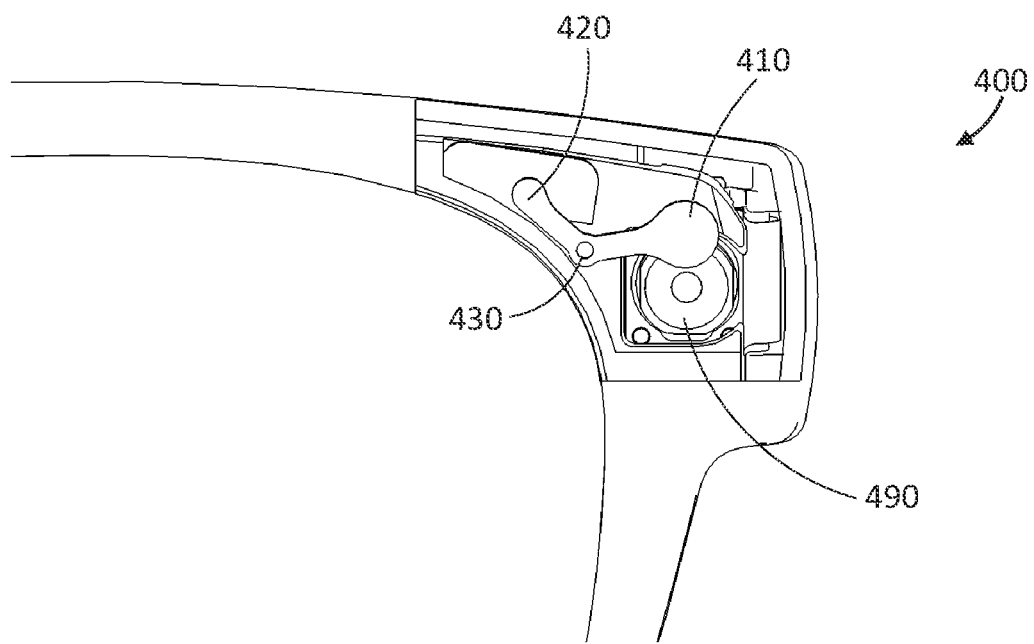

FIGS. 4A and 4B are front partial cutaway views of a camera privacy system implemented in a wearable device 400. Wearable device 400 can be similar to wearable device 300a in FIG. 3A, in that a camera 490 can be positioned at an upper-right corner of wearable device 400 from a bystander perspective (upper-left corner from a user perspective). FIGS. 4A and 4B show a zoomed in view which focuses on the camera position. Further, the features described with reference to FIGS. 4A and 4B are also applicable to wearable devices with differently positioned cameras, such as those described with reference to FIGS. 3B and 3C.

FIG. 4A illustrates a camera cover 410 in a closed position, in which camera cover 410 occludes a field of view of a camera 490. FIG. 4B illustrates camera cover 410 in an open position, where camera cover 410 is at least partially out of the field of view of camera 490. Camera cover 410 can be coupled to an actuator (not shown in FIGS. 4A and 4B), such as those described later with reference to FIGS. 5A, 5B, 5C, 6A, 6B, 7A, 7B, 10A, 10B, 10C, 10D, 10E, 16A, and 16B. The actuator can cause the camera cover to move between the open position and the closed position.

In the case of wearable device 400, a member 420 can couple the actuator to camera cover 410. Member 420 can be integrally formed with camera cover 410 as shown in FIGS. 4A and 4B, or member 420 could be a separate component coupled to camera cover 410. A pivot 430 can be positioned on member 420. In an exemplary construction, pivot 430 could include a pin or similar mounted in wearable device 400, and rotatably coupled to member 420. In this way, member 420 can rotate about the pin. In turn, camera cover 410 can rotate about pivot 430, such that a first angular position of camera cover 410 can correspond to the closed position as illustrated in FIG. 4A, and a second angular position of camera cover 410 can correspond to the open position as illustrated in FIG. 4B. In this way, by actuating member 420, camera cover 410 can be moved between the closed position and the open position.

Figure 5A:
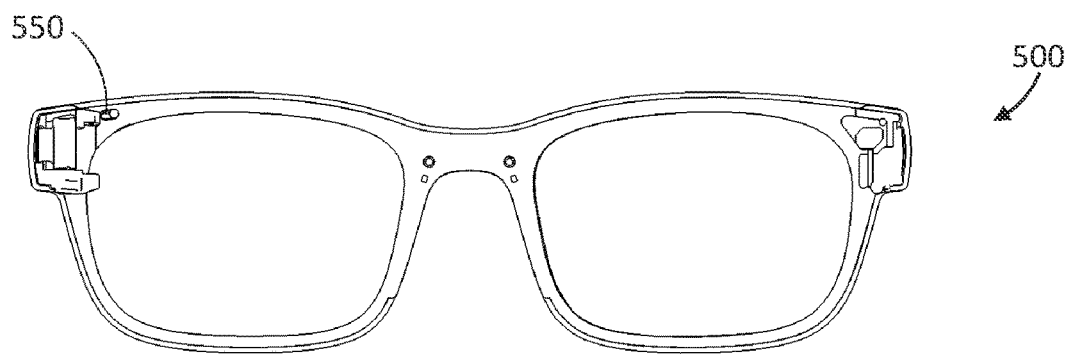
FIGS. 5A, 5B, and 5C are respective rear views of an exemplary actuator of a wearable device, which can be used to actuate any of the camera privacy systems described herein, in accordance with at least one implementation of the present systems and devices.
Figure 5B:
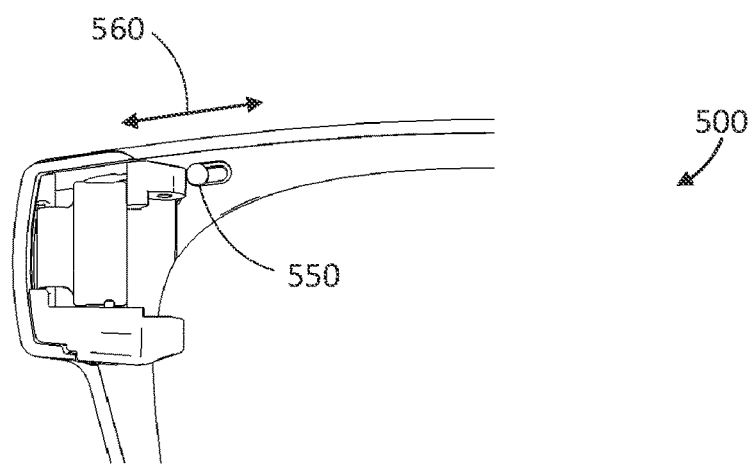
Figure 5C:
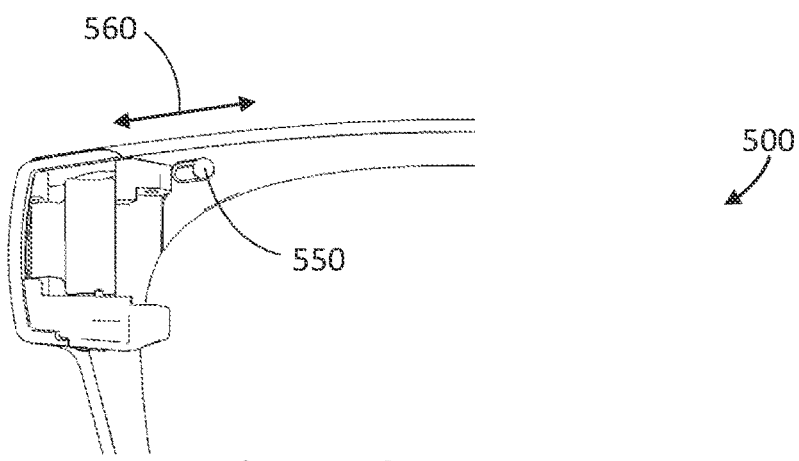

FIGS. 5A, 5B, and 5C are respective rear views which illustrate an exemplary wearable device 500 which includes an exemplary actuator 550, which can be used to actuate any of the camera covers described herein. FIG. 5A illustrates a rear view of wearable device 500. FIGS. 5B and 5C illustrate zoomed-in views of the wearable device 500, which focus on actuator 550. Arms of wearable device 500 are not illustrated in FIGS. 5A, 5B, and 5C to more clearly show features being described.

In FIGS. 5A, 5B, and 5C, actuator 550 is slidable in the direction of an axis 560 between a first position illustrated in FIG. 5B and second position illustrated in FIG. 5C. Actuator 550 can be moved between the first position and the second position by a physical force applied by the user. For example, the user may use a finger to push or flick actuator from the first position to the second position, or from the second position to the first position. Actuator 550 can be coupled to a camera cover such as those described with reference to FIGS. 4A, 4B, 8A, 8B, 8C, 9, 11A, 11B, 12A, 12B, 13, 14A, 14B, 15A, 15B, 17A, and 17B. In this way, by controlling the position of actuator 550, the user can control the position of the camera cover.

Figure 6A:
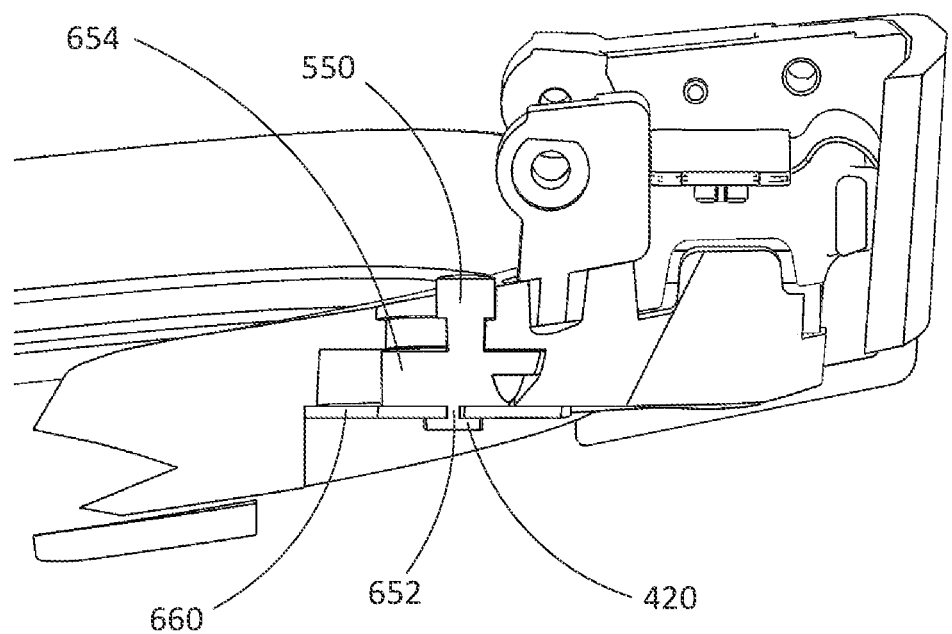
FIGS. 6A and 6B are respective top cutaway views of an exemplary coupling between an actuator and a camera cover, in accordance with at least one implementation of the present systems and devices.
Figure 6B:
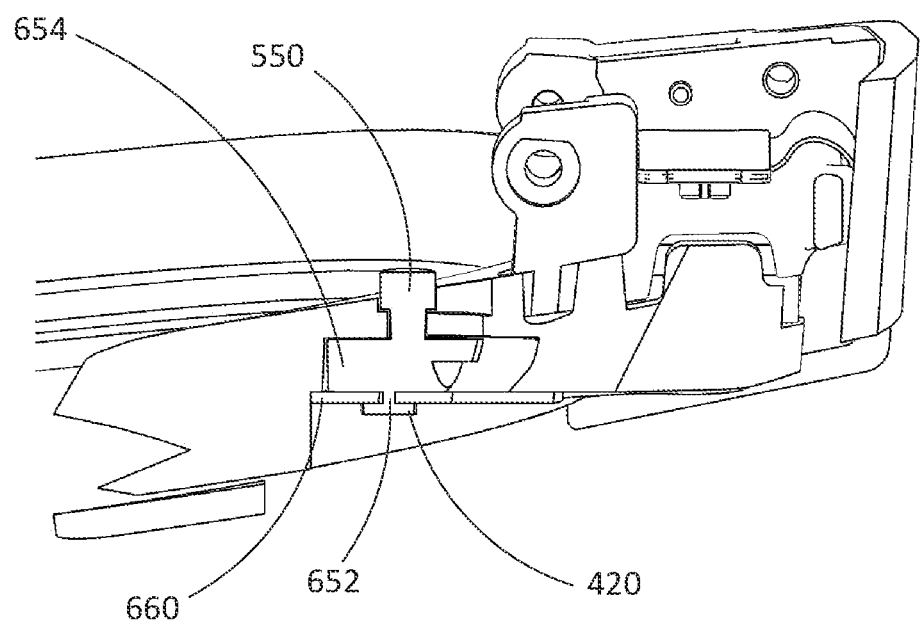

FIGS. 6A and 6B are respective top cutaway views which illustrate an exemplary coupling between an actuator and a camera cover. Actuator 550 can be coupled to camera cover 410 via member 420. In the example of FIGS. 6A and 6B, actuator 550 can be mechanically coupled to member 420, such as by a pin 652.

FIG. 6A illustrates actuator 550 in a first position, corresponding to the first position of actuator 550 illustrated in FIG. 5B. Further, member 420 is in a position in which the camera cover 410 will be held in the closed position as illustrated in FIG. 4A. The pin 652 can hold member 420 in the position illustrated in FIG. 6A, such that when actuator 550 is in the first position, camera cover 410 is in the closed position.

FIG. 6B illustrates actuator 550 in a second position corresponding to the second position of actuator 550 illustrated in FIG. 5C. Further, member 420 is in a position in which camera cover 410 will be held in the open position as illustrated in FIG. 4B. The pin 652 can hold member 420 in the position illustrated in FIG. 6B, such that when actuator 550 is in the second position, camera cover 410 is in the open position.

When the user moves actuator 550 between the first position and the second position, the force applied by pin 652 on member 420 will cause member 420 to move with actuator 550, and will consequently cause camera cover 410 to move between the closed position and the open position.

Optionally, actuator 550 can include or be coupled to a stabilizer 654. In the example of FIGS. 6A and 6B, stabilizer 654 can be a component which has a larger area in at least one direction, which fits in a recess of the wearable device to prevent the actuator 550 from tipping or bending outside of the desired direction of movement.

Generally, it is desirable to position camera 490 within a housing, in order to protect camera 490 from dust, moisture, and physical damage. Further, since camera cover 410 and member 420 can potentially be small and delicate components, it can be desirable to also provide a protective housing around camera cover 410 and member 420. Advantageously, the coupling between actuator 550 and camera cover 410 via member 420 and pin 652 provides an actuator 550 externally accessible on a wearable device, which can move a camera cover 410 internally positioned in a housing of the wearable device. This allows camera cover 410 and camera 490 to be positioned within a protective housing.

With wearable devices, it can be important to provide a water resistant or waterproof housing around camera 490, since the user may not be able to remove and/or protect their wearable devices in circumstances such as rain. However, in the examples of FIGS. 6A and 6B, pin 652 passes between the external actuator 550 and the internal member 420, which can result in an aperture through which moisture and dust may enter the housing. To address this, a barrier 660 can be provided. Barrier 660 can be a flexible membrane or bushing which provides a water and/or dust resistant seal around pin 652, thereby enabling camera 490, camera cover 410, and member 420 to be sealed within a housing.

Figure 7A:
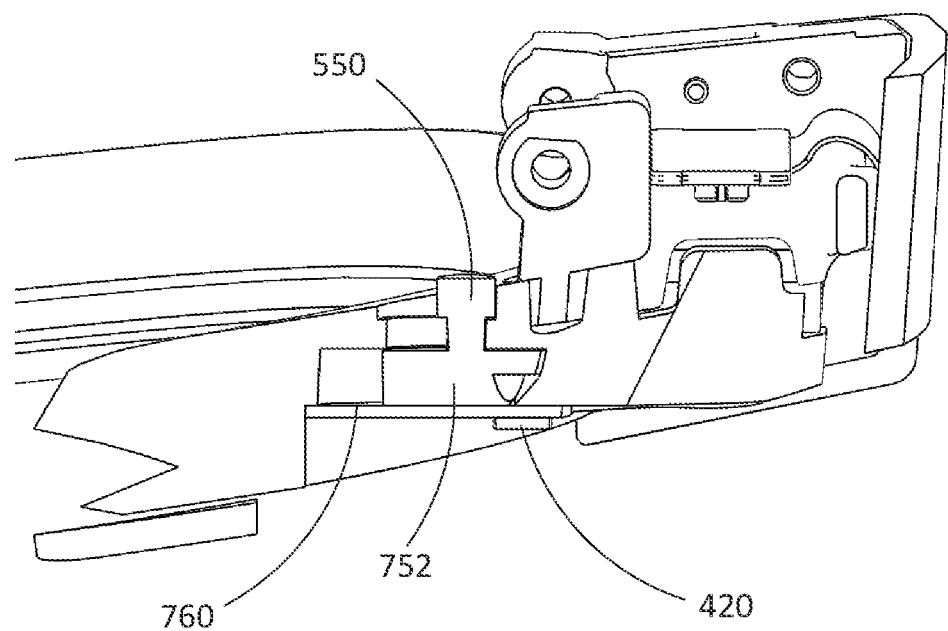
FIGS. 7A and 7B are respective top cutaway views of another exemplary coupling between an actuator and a camera cover, in accordance with at least one implementation of the present systems and devices.
Figure 7B:
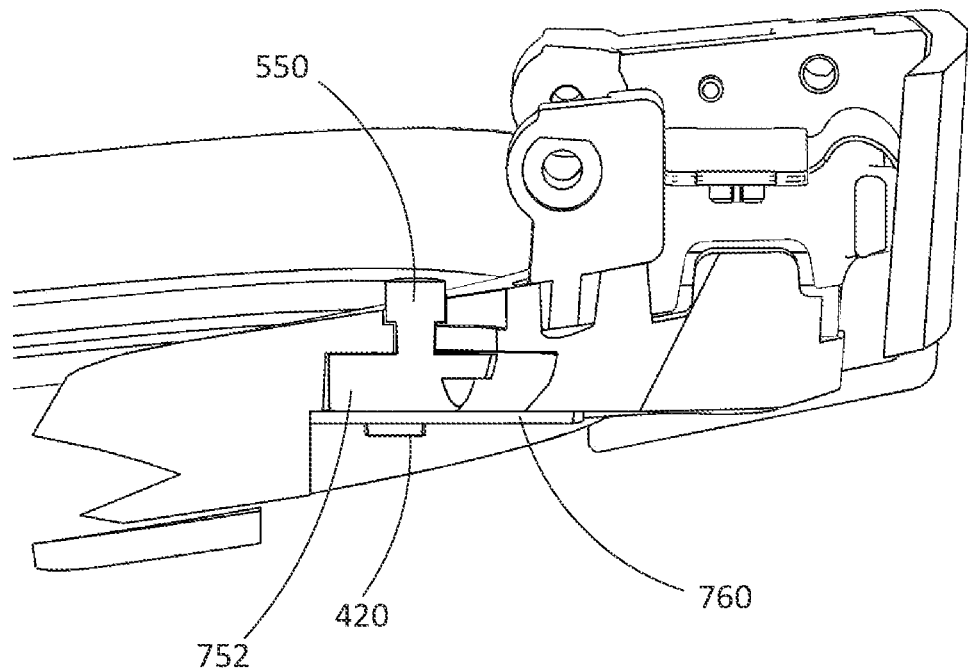

However, including such a flexible membrane or bushing can increase manufacturing difficulty and cost, may reduce effectiveness of the sealing, and may reduce durability of the device. FIGS. 7A and 7B discussed below provide a solution to these issues.

FIGS. 7A and 7B are respective top cutaway views which illustrate an exemplary coupling between an actuator and a camera cover. Actuator 550 can be magnetically coupled to camera cover 410 via member 420. In the example of FIGS. 7A and 7B, actuator 550 includes or can be coupled to a magnet 752. Magnet 752 could be a rare-earth magnet, to prevent magnet 752 from losing magnetization over time, or magnet 752 could be a magnetized material. Member 420 can be a ferromagnetic material, such that member 420 is magnetically attracted to magnet 752, even across a barrier 760.

FIG. 7A illustrates actuator 550 in a first position, corresponding to the first position of actuator 550 illustrated in FIG. 5B. Further, member 420 is in a position in which camera cover 410 will be in a closed position as illustrated in FIG. 4A. The magnetic force of magnet 752 can hold member 420 in the position illustrated in FIG. 7A, such that when actuator 550 is in the first position, camera cover 410 is in the closed position.

FIG. 7B illustrates actuator 550 in a second position corresponding to the second position of actuator 550 illustrated in FIG. 5C. Further, member 420 is in a position in which camera cover 410 is in the open position as illustrated in FIG. 4B. The magnetic force of magnet 752 can hold member 420 in the position illustrated in FIG. 7B, such that when actuator 550 is in the second position, camera cover 410 is in the open position.

When the user moves actuator 550 between the first position and the second position, the magnetic force applied by magnet 752 on member 420 will cause member 420 to move with magnet 752, and will consequently cause camera cover 410 to move between the closed position and the open position.

In alternative implementations, actuator 550 could include or be coupled to a ferromagnetic material, and member 420 could include or be coupled to a magnet, to achieve similar actuation of the camera cover described above.

Advantageously, by coupling actuator 550 to member 420 magnetically, design and manufacturability of a camera housing can be improved. In particular, barrier 760 can be rigid, which can be more durable and easier to manufacture than a flexible barrier, and can provide a more effective seal. Barrier 760 can be designed to be thin, so that magnet 752 can be of relatively low strength but achieve effective coupling with member 420.

Figure 8A:
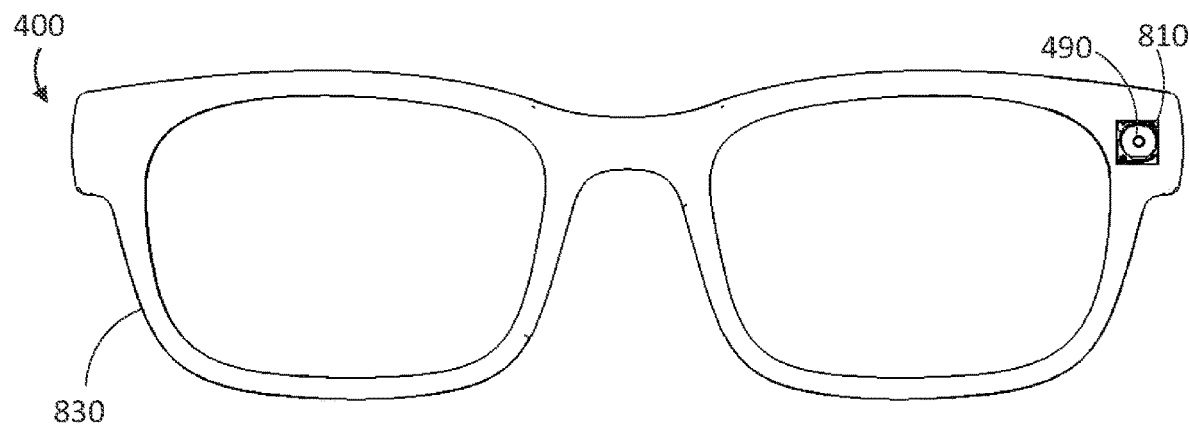
FIGS. 8A, 8B, and 8C are respective front views of an exemplary camera housing which could be implemented in the wearable devices described herein, in accordance with at least one exemplary implementation of the present systems and devices.
Figure 8B:
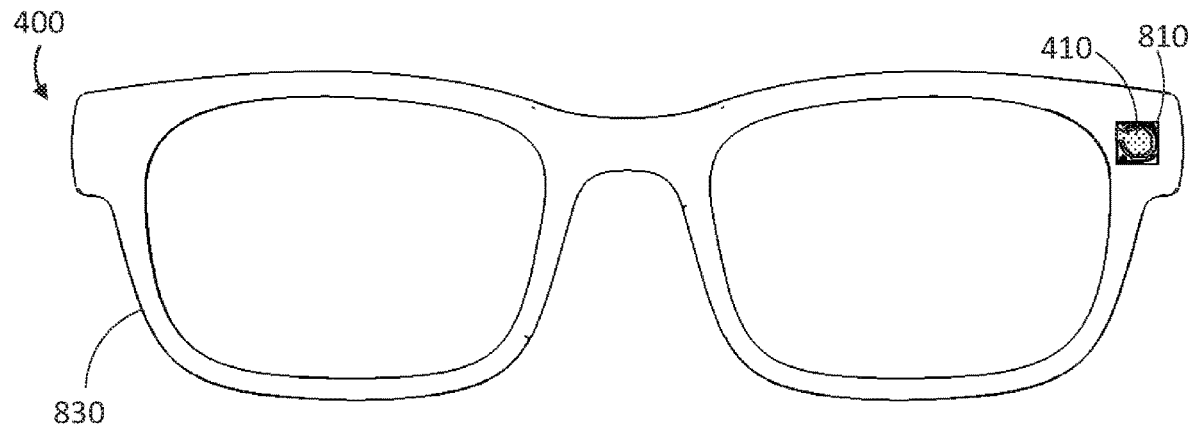
Figure 8C:
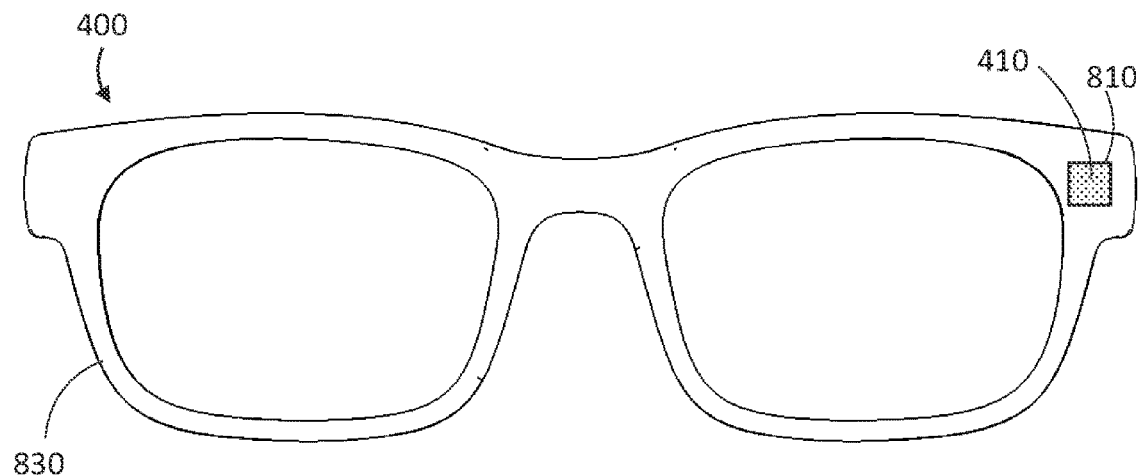

FIGS. 8A, 8B, and 8C are respective front views which illustrate an exemplary camera housing in the wearable devices described herein. FIGS. 8A, 8B, and 8C are similar in at least some respects to FIG. 3A. FIGS. 8A, 8B, and 8C illustrate wearable device 400, and in particular illustrate a front frame 830 of wearable device 400. Front frame 830 can have an aperture 810, which allows environmental light to enter into wearable device 400 and impinge on camera 490 therein illustrated in FIG. 8A. Aperture 810 may also result in camera 490 being visible external to wearable device 400. Aperture 810 is shown in FIGS. 8A, 8B, and 8C as being square, but in practice any appropriate aperture shape could be implemented, such as rectangular, circular, or oblong, as examples.

Aperture 810 can be an unshielded opening, or can be covered by a transparent or translucent shield. Such a shield can help to provide a water and or dust resistant housing. In particular, such a shield could be paired with a housing around other sides of camera 490 to provide a water and/or dust resistant housing around camera 490. Further, at least camera cover 410 could also be positioned within said housing, as illustrated in FIGS. 8B and 8C.

FIG. 8B shows camera cover 410 in the closed position, visible through aperture 810. In the example of FIG. 8B, camera cover 410 is of minimal size to occlude a field of view of camera 490. Consequently, even when camera cover 410 is in the closed position, other components behind front frame 830 may be visible external to wearable device 400 besides camera cover 410.

FIG. 8C shows camera cover 410 in the closed position, visible through aperture 410. In the example of FIG. 8C, camera cover 410 is large enough such that aperture 810 is completely obscured by camera cover 410, and no other components behind front frame 830 are visible.

Having a static shield positioned over aperture 810, with camera cover 410 being movable between an open position and a closed position behind front frame 830, improves manufacturability and robustness of wearable device 400. In particular, rather than requiring flexible or dynamic water and/or dust resistant shielding, a static shield can be cheaper and easier to manufacture and more durable. Further, positioning camera cover 410 and associated components behind front frame 830 can be more aesthetically appealing.

In the implementations shown in FIGS. 8A, 8B, and 8C, camera 490 is externally visible when camera cover 410 is in the open position, and camera cover 410 is externally visible when camera cover 410 is in the closed position. This can be advantageous for providing information about the state of camera 490 to bystanders.

In a first example, camera cover 410 can be colored or patterned such that camera cover 410 itself serves as a clearly visible indicator that camera 490 cannot capture meaningful data. For example, camera cover 410 could be formed of a colored material, or could be coated or painted with a colored material. Visibility of this color to bystanders can provide a clear indication that camera 490 cannot capture meaningful data. For example, camera cover 410 could be white in color, and front frame 830 could be another color such as black. In this example, when camera cover 410 is in the closed position, white camera cover 410 will be obvious against black front frame 830, such that bystanders know that camera 490 cannot capture meaningful data. On the other hand, when camera cover 410 is in the open position, white camera cover 410 will not be visible, and instead camera 490 itself will be visible, such that bystanders know that camera 490 can capture meaningful data.

However, such a design may be aesthetically unpleasing, and may also confuse bystanders who are not familiar with the wearable device, since they may not be aware of how to interpret the presented color. As an example, if camera cover 410 were red and in the closed position, bystanders may incorrectly interpret this to mean that a camera on the wearable device CAN capture data. This interpretation could arise because in other devices, such as video recording devices, a red light is commonly activated to indicate when a camera is recording.

In a second example, camera cover 410 could be colored or patterned to closely fit with the design of front frame 830, such that when camera cover 410 is in the closed position, camera 490 is prevented from being able to capture meaningful data, and camera 490 is obscured from being visible to bystanders. In this example, when camera cover 410 is in the open position such that camera 490 can capture meaningful data, camera 490 will also be visible to bystanders, such that bystanders will know that camera 490 can capture meaningful data. On the other hand, when camera cover 410 is in the closed position such that camera 490 cannot capture meaningful data, camera 490 will not be visible to bystanders. This implementation advantageously eliminates the need for bystanders to be familiar with the wearable device, in that when bystanders can see the camera, the camera can see them, whereas when bystanders cannot see the camera, the camera cannot see them. Bystanders who are not familiar with the wearable device 400 and are not aware that the wearable device 400 includes a camera 490 should not be concerned about being recorded when the camera cover 410 is in the closed position, since they cannot see the camera, and the camera cannot capture meaningful data. On the other hand, bystanders who are not familiar with the wearable device 400 will be able to see the camera 490 when camera cover 410 is in the open position, and will thus know that camera 490 can capture data representing them.

Figure 9:
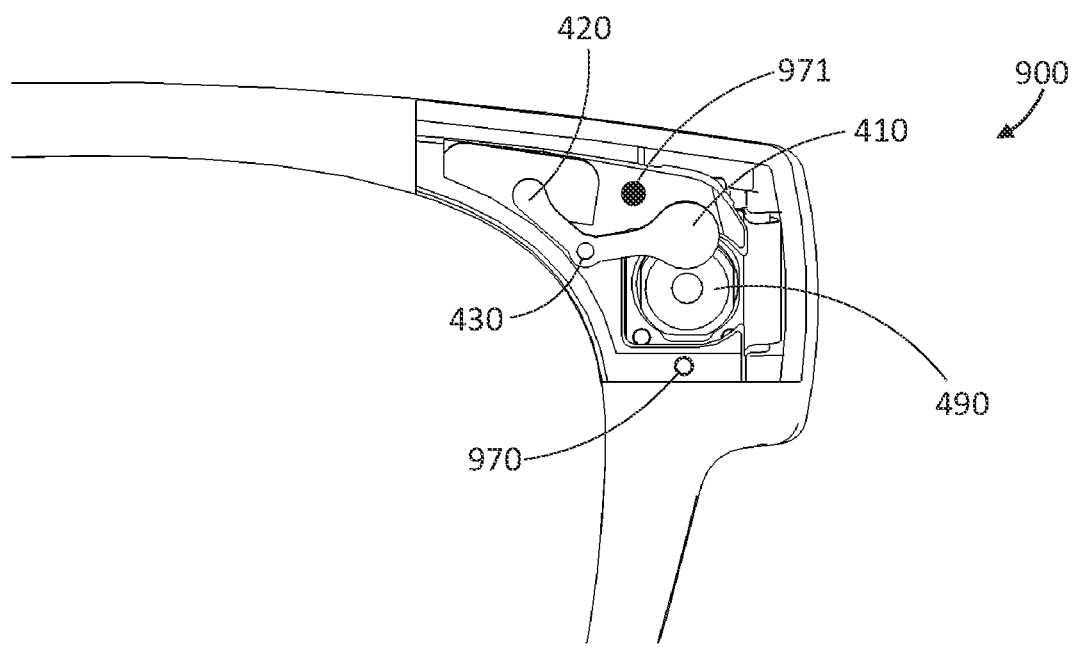
FIG. 9 is a front partial cutaway view of an exemplary wearable device which includes external information indicators, according to at least one exemplary implementation of the present systems and devices.

In addition to the above, additional indicators can be provided in the wearable devices described herein, which provide additional information about the state and actions of the camera. In this regard, FIG. 9 is a front partial cutaway view of an exemplary wearable device 900, which can be similar in at least some respects to wearable device 400 described above. Description of components of wearable device 400 can be applicable to similarly numbered components in wearable device 900 illustrated in FIG. 9.

One difference between wearable device 900 and wearable device 400 is that wearable device 900 includes one or more indicator lights 970. Only one indicator light 970 is illustrated in FIG. 9 to avoid clutter, but in practice any appropriate quantity of indicator lights could be used. Indicator light 970 could be for example an LED light. Indicator light 970 can be visible externally to bystanders when camera cover 410 is in the open position (or always visible), to provide additional information to bystanders. For example, when camera 490 captures data (or shortly before), indicator light 970 can activate and produce light visible external to wearable device 900, to be seen by bystanders. In use, this could provide an indication to bystanders that not only is camera 490 able to capture meaningful data, but that camera 490 is actually capturing data.

Another difference between wearable device 900 and wearable device 400 is that wearable device 900 includes one or more speakers 971. Only one speaker 971 is illustrated in FIG. 9 to avoid clutter, but in practice any appropriate quantity of speakers could be used. Speaker 971 can be capable of generating sound which is audible externally to bystanders, to provide additional information to bystanders. For example, when camera 490 captures data (or shortly before), speaker 971 can activate and produce a sound audible to bystanders, such as a tone, beep, or camera shutter noise. In use, this could provide an indication to bystanders that not only is camera 490 able to capture meaningful data, but that camera 490 is actually capturing data.

Speaker 971 could be a high-fidelity speaker capable of outputting a significant range of sounds to be heard by bystanders. However, to optimize space and power consumption, it can be desirable for speaker 971 to instead be a low-fidelity speaker which is limited to producing basic sounds, such as tones or beeps. Such low-fidelity sound can be sufficient for providing information about camera actions of the wearable device to bystanders.

It is possible for speaker 971 to be positioned near at least one aperture which allows sound to pass therethrough; however such apertures can add complexity and cost to making wearable device 900 water and/or dust resistant. Instead, speaker 971 can be positioned within a water and/or dust resistant housing of wearable device 900, and speaker 971 can output sound at a high enough level to be audible through the housing. If low-fidelity sound is acceptable, muffling of the sound caused by the housing can also be acceptable. Further, transmission of sound from speaker 971 through the housing can be improved by positioning speaker 971 to be in direct contact with the housing. Further, thickness of the housing could be thinner at the position of speaker 971, to improve sound transmission.

Although FIG. 9 illustrates wearable device 900 as including both indicator light 970 and speaker 971, it is within the scope of the present disclosure to provide wearable devices with only an indicator light or with only a speaker.

More detailed information can be provided to bystanders by presenting "codes" via any available output mechanisms. As one example, in a wearable device which only includes a single indicator light and no speaker, temporal codes such as flashing of the indicator light could be used to provide information to bystanders. As examples, a brief flash could indicate that an instant of camera data was captured as an image; repetitive flashing could indicate that data is being captured for computer vision purposes, and will not be stored; continuous light could indicate that video data is being captured to be stored for future viewing.

As another example, in a wearable device with multiple indicator lights, the number or pattern of indicator lights which are active could provide information to bystanders. In a wearable device with a speaker, different sounds could be used to provide information to bystanders.

Any of the above could be combined to provide more detailed information to bystanders. For example, temporal codes could be output by multiple indicator lights, or by a speaker. As another example, indicator lights could be used in combination with a speaker to provide detailed information to bystanders.

In FIG. 9, indicator light 970 and speaker 971 are illustrated as being positioned near camera 490. However, this is not necessarily the case, and indicator light 970 and speaker 971 could be positioned anywhere on wearable device 900 as appropriate for a given application.

FIGS. 6A, 6B, 7A, and 7B above show exemplary implementations of actuator 550. However, other implementations of actuator are possible, as shown in FIGS. 10A, 10B, 10C, 10D, and 10E, and discussed below.

Figure 10A:
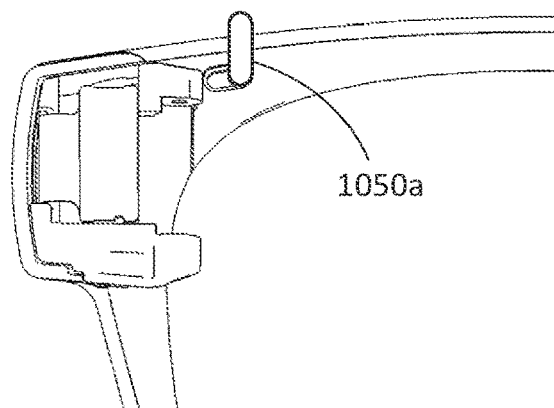
FIGS. 10A and 10B are respective rear views of wearable devices, which illustrate exemplary actuator shapes and positions in accordance with at least two exemplary implementations of the present systems and devices.

FIG. 10A is a rear view of a wearable device which includes an actuator 1050*a*, which can be similar to actuator 550 discussed above. Arms of the wearable device in FIG. 10A are not illustrated to more clearly show features being described. One difference between actuator 1050*a* and actuator 550 is that actuator 1050*a* is shaped differently. In particular, actuator 1050*a* projects upwards to be more accessible to a user. Actuator 1050*a* can slide between a first position and a second position similarly to actuator 550, but a portion of actuator 1050*a* which is pushed or flicked by a user can protrude upwards. In the case of FIG. 10A, actuator 1050*a* projects above a top of the wearable device, but this is not necessarily required.

Figure 10B:
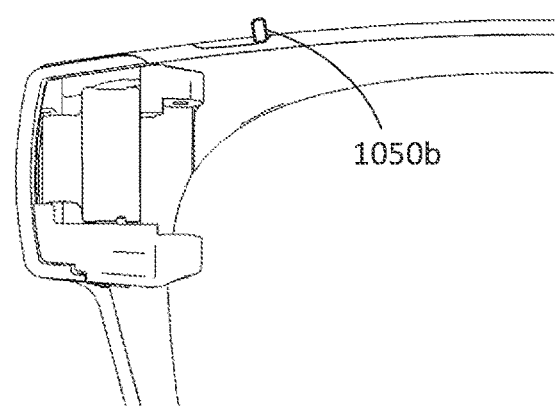

FIG. 10B is a rear view of a wearable device which includes an actuator 1050*b*, which can be similar to actuator 550 discussed above. Arms of the wearable device in FIG. 10B are not illustrated to more clearly show features being described. One difference between actuator 1050*b* and actuator 550 is that actuator 1050*b* is positioned on a top portion of the wearable device, to be more accessible to a user. A difference between actuator 1050*a* of FIG. 10A and actuator 1050*b* of FIG. 10B is that actuator 1050*a* slides on a rear side of the wearable device with a protrusion which extends upwards, whereas actuator 1050b slides between a first position and a second position on a top surface of the wearable device.

Figure 10C:
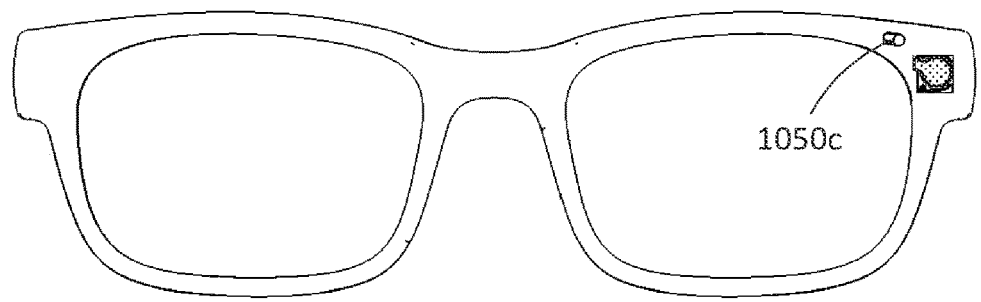
FIG. 10C is a front view of a wearable device, which illustrates an exemplary actuator shape and position in accordance with at least one exemplary implementation of the present systems and devices.

FIG. 10C is a front view of a wearable device which includes an actuator 1050c which can be similar to actuator 550 discussed above. One difference between actuator 1050c and actuator 550 is that actuator 1050c is positioned on a front side of the wearable device to be more accessible to a user, whereas actuator 550 is positioned on a rear side of the wearable device to be more hidden.

Figure 10D:
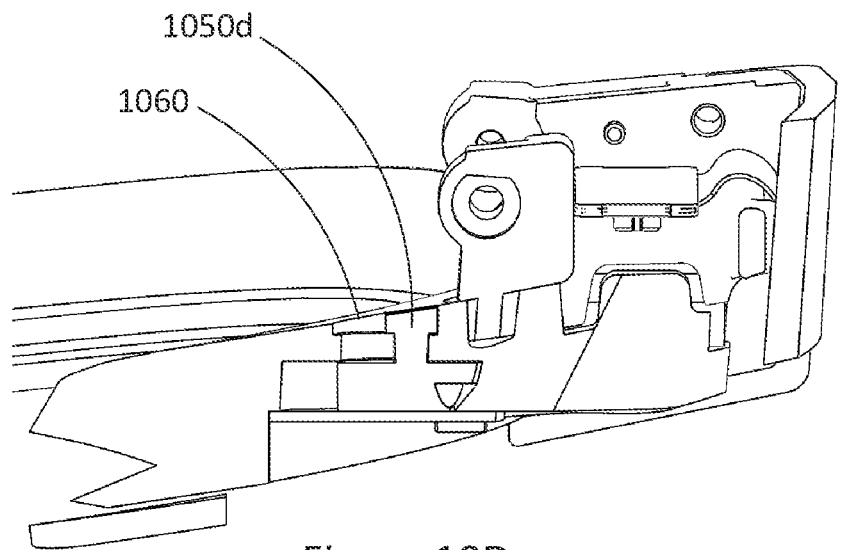
FIGS. 10D and 10E are respective top partial cutaway views of wearable devices, which illustrate exemplary actuator shapes and positions in accordance with at least two exemplary implementations of the present systems and devices.

FIG. 10D is a top partial cutaway view of a wearable device which includes an actuator 1050d which can be similar to actuator 550 described above. One difference between actuator 1050d and actuator 550 is that actuator 550 projects outward beyond a surface of the wearable device to be easier to actuate by the user, whereas actuator 1050d is flush with a surface 1060 of the wearable device, such that the wearable device is more streamlined.

Figure 10E:
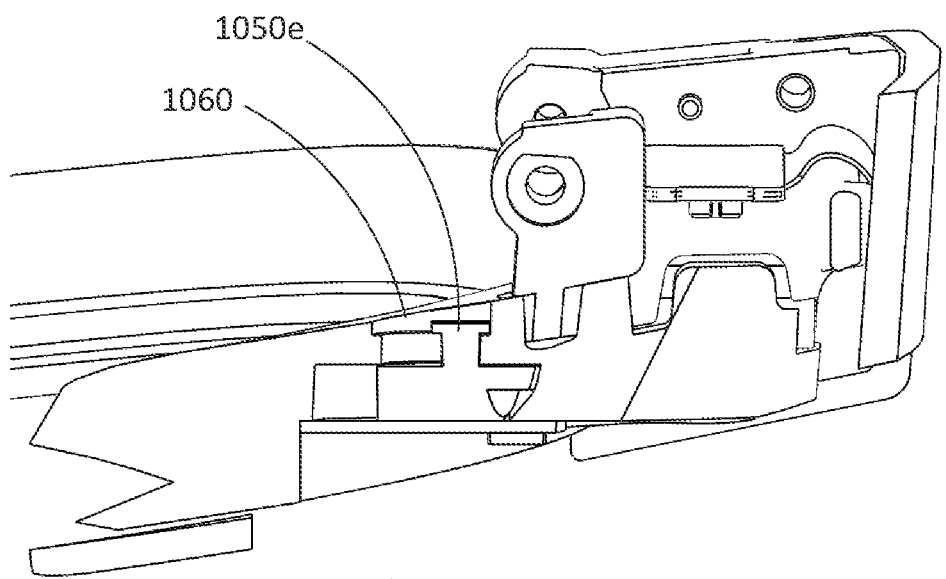

FIG. 10E is a top partial cutaway view of a wearable device which includes an actuator 1050e which can be similar to actuator 550 described above. One difference between actuator 1050e and actuator 550 is that actuator 550 projects outward beyond a surface of the wearable device to be easier to actuate by the user, whereas actuator 1050e is sunken into surface 1060 of the wearable device, such that the wearable device is more streamlined.

FIGS. 5A, 5B, 5C, 6A, 6B, 7A, 7B, 10A, 10B, 10C, 10D, and 10E each illustrate implementations of actuators which are actuated by a physical force applied by a user, such as the user pushing or flicking the actuator. Such actuators thus require the user to reach up and touch the wearable device, which can have the advantage of being very clear to bystanders when the user is switching the wearable device between modes where the camera can capture meaningful data or not. Further, having a physical camera cover which occludes a field of view of the camera in a closed position, and requires mechanical force from the user to switch to the open position, advantageously provides a more secure system which cannot be hacked. Systems which electrically control whether the camera can capture meaningful data could potentially be hacked, such as by malicious third parties, or by user who which to circumvent privacy protections. Requiring mechanical force from the user eliminates this issue.

Figure 11A:
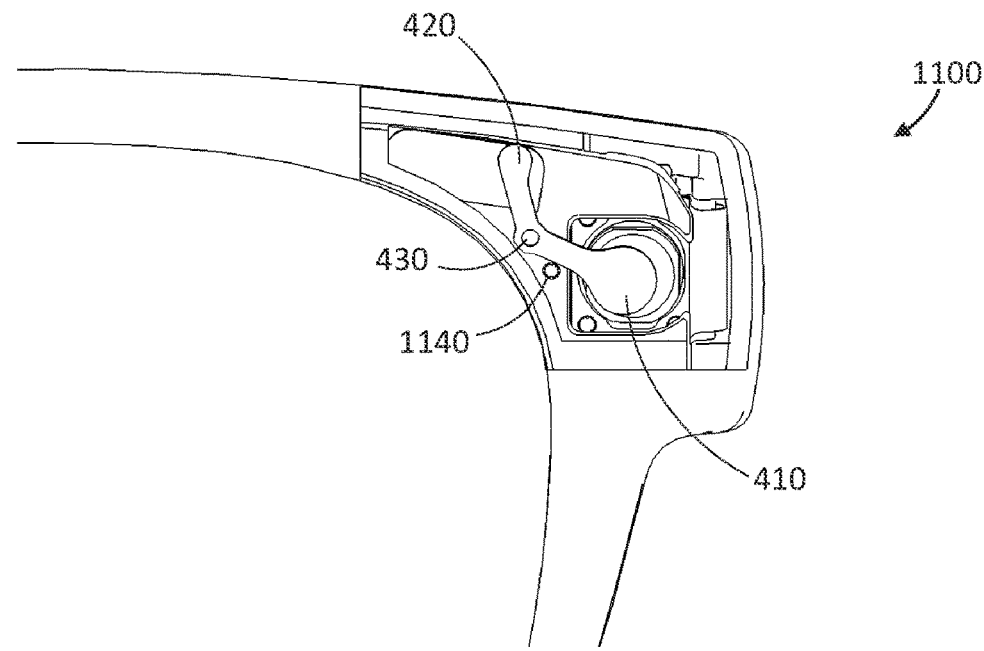
FIGS. 11A and 11B are respective front partial cutaway views of a camera privacy system implemented in a wearable device which can include at least one restrain member, in accordance with at least one implementation of the present systems and devices.
Figure 11B:
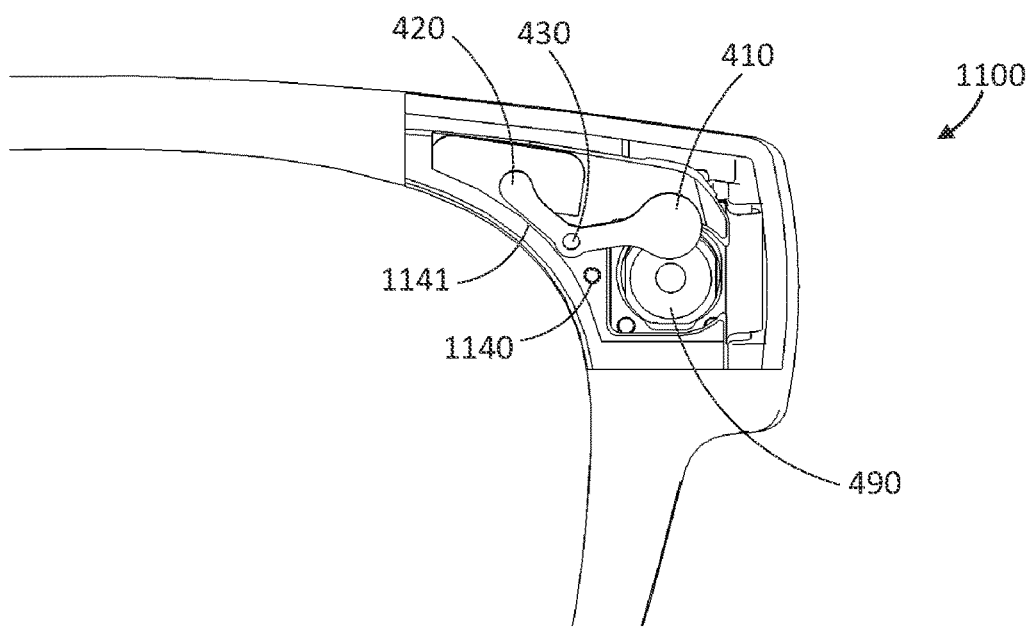

FIGS. 11A and 11B are respective front partial cutaway views of a camera privacy system implemented in a wearable device 1100, which can be similar in at least some respects to wearable device 400 illustrated in FIGS. 4A and 4B. Description of components of wearable device 400 can be applicable to similarly numbered components in wearable device 1100.

One difference between wearable device 1100 and wearable device 400 is that wearable device 1100 includes at least one restrain member 1140. Restrain member 1140 can limit a range of motion of camera cover 410 to between the open position and the closed position. In the example of FIGS. 11A and 11B, restrain member 1140 restricts camera cover 410 from moving beyond the closed position.

As can be seen in FIG. 11A, when camera cover 410 is in the closed position, member 420 can contact restrain member 1140. Restrain member 1140 can be mounted within wearable device 1100 to be rigid with respect to camera cover 410, such that camera cover 410 cannot move past restrain member 1140.

As can be seen in FIG. 11B, when camera cover 410 is in the open position, member 420 can contact a surface 1141 within wearable device 1100. Surface 1141 can be rigid with respect to member 420, such that member 420 cannot move past surface 1141 and thus camera cover 410 cannot move beyond the open position.

FIGS. 11A and 11B only illustrate a single restrain member 1140, and a surface 1141 which can act as a second restrain member. However, in some embodiments the device 1100 can include multiple dedicated restrain members to limit the range of motion of camera cover 410. Further, restrain member 1140 in FIGS. 11A and 11B is illustrated as a round protrusion or pin. However, the present disclosure can include different shapes of restrain members, including bars, ridges, tabs, and grooves, as non-limiting examples.

Limiting movement of the camera cover 410 and member 420 to between the open position and the closed position can help prevent damage to the camera privacy system. For example, absent any restrain members, shock or strong impact to wearable device 400 may cause inertial force to be imparted on camera cover 410 in a direction which will cause camera cover to move outside of the range between the open position and the closed position, which may damage or break coupling between actuator 550 and member 420. As examples, this could be bending or breaking of pin 652 in FIGS. 6A and 6B, or loss of magnetic coupling between magnet 752 and member 420 in FIGS. 7A and 7B. Restrain members which limit the range of motion of camera cover 410 to between the open position and the closed position may be able to prevent this damage in the first place, by reinforcing the boundaries of movement of camera cover 410.

Further, in the case of FIGS. 7A and 7B, even if magnetic coupling between magnet 752 and member 420 is lost, limiting the range of motion of camera cover 410 to between the closed position and the open position will enable magnetic coupling to be recovered. In particular, if magnetic coupling is lost, camera cover 410 and member 420 will rotate freely, without being coupled to actuator 550. Restrain members can keep the position of camera cover 410 and member 420 to between the open position and the closed position, such that magnetic coupling can be regained by moving actuator 550 between the first position and the second position until magnet 752 lines up with member 420, at which point coupling will be restored. Absent any restrain members, camera cover 410 and member 420 could fall outside the range between the open position and the closed position, such that even moving the actuator 550 between the first position and the second position will not align magnet 752 with member 420, making it difficult to restore magnetic coupling.

Figure 12A:
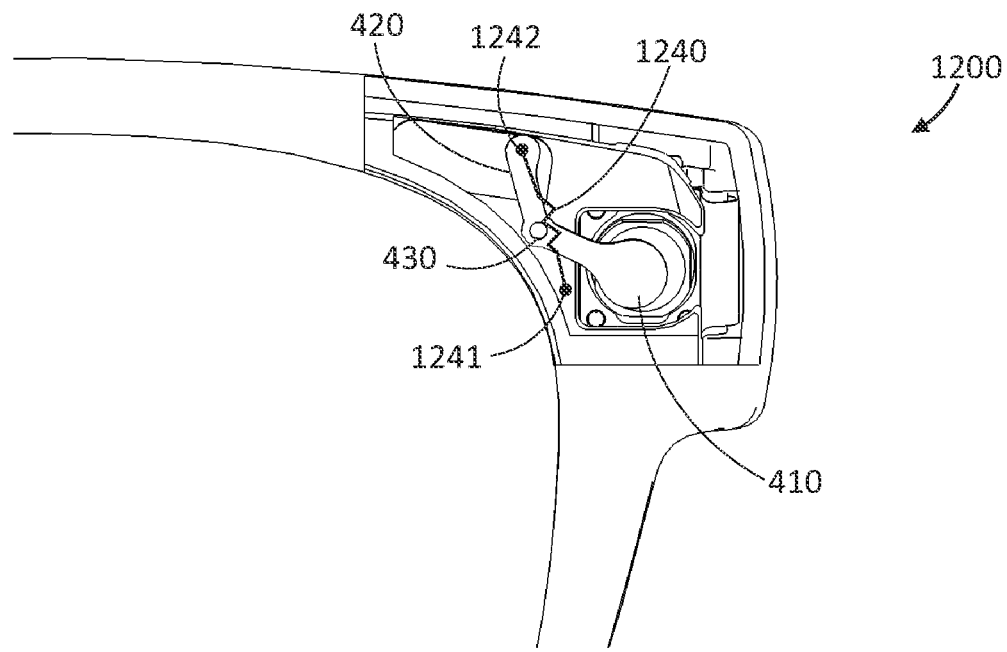
FIGS. 12A and 12B are respective front partial cutaway views of a camera privacy system implemented in a wearable device which can include at least one bias member, in accordance with at least one implementation of the present systems and devices.
Figure 12B:
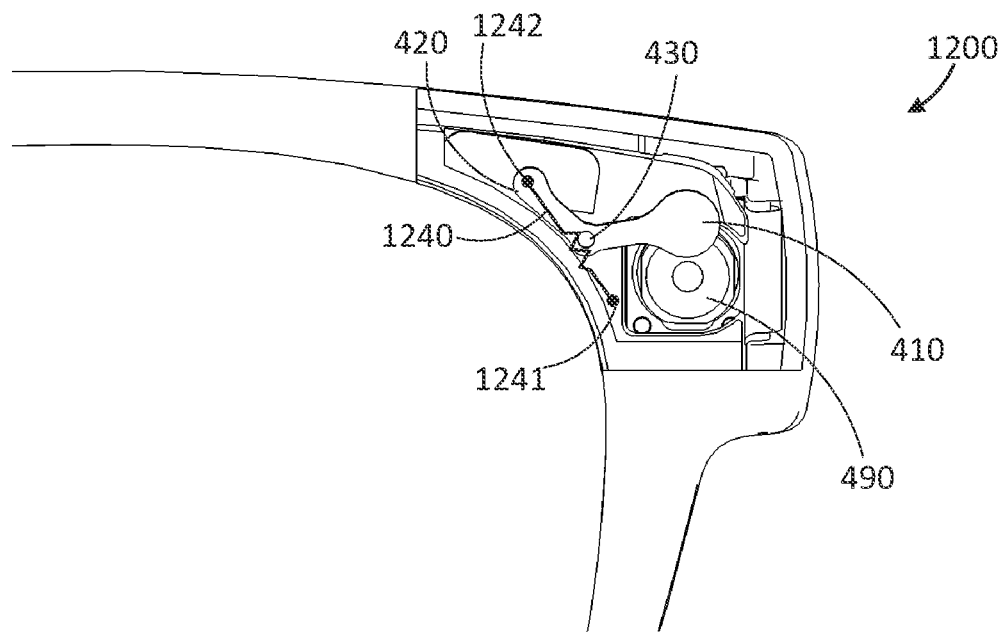

FIGS. 12A and 12B are partial cutaway views of a camera privacy system implemented in a wearable device 1200, which can be similar in at least some respects to wearable device 400 illustrated in FIGS. 4A and 4B. Description of components of wearable device 400 can be applicable to similarly numbered component in wearable device 1200.

One difference between wearable device 1200 and wearable device 400 is that wearable device 1200 includes at least one bias member 1240. Bias member 1240 can bias camera cover 410 towards either the closed position or the open position. The exemplary bias member 1240 illustrated in FIGS. 12A and 12B can be a spring or elastic member. Bias member 1240 can be coupled to wearable device 1200 at a point 1241, and bias member can be coupled to member 420 at a point 1242. In this way, bias member 1240 will pull on member 420, such that camera cover 410 is biased towards either the open position or the closed position. Further, point 1241 and point 1242 can be chosen to straddle pivot 430 as illustrated in FIGS. 12A and 12B. In this way, when camera cover 410 is in the closed position illustrated in FIG. 12A, bias member 1240 will pull on member 420 to bias camera cover 410 towards the closed position. Similarly, when camera cover 410 is in the open position illustrated in FIG. 12B, bias member 1240 will pull on member 420 to bias camera cover 410 towards the open position. Thus, bias member 1240 as illustrated in FIGS. 12A and 12B can help maintain camera cover 410 completely in the closed position or completely in the open position.

Figure 13:
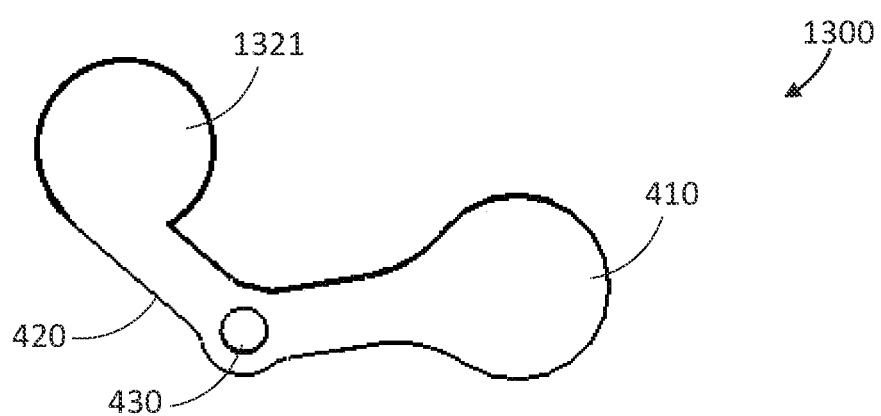
FIG. 13 is a front view of an exemplary component which includes a camera cover, which can be implemented in camera privacy systems discussed herein.

FIG. 13 is a front view which illustrates an exemplary component 1300, which could be implemented in the wearable devices discussed herein, including at least wearable devices 400, 900, 1100, and 1200 in FIGS. 4A, 4B, 8A, 8B, 8C, 9, 11A, 11B, 12A, and 12B. Component 1300 can include camera cover 410 and member 420, which are rotatable around pivot 430, similar to those described with reference to FIGS. 4A and 4B. Further, component 1300 includes a ballast 1321, which can be coupled to or integrally formed with member 420. Ballast 1321 can be designed to balance the weight of component 1300 across pivot 430. In particular, due to the size of camera cover 410 which occludes a field of view of a camera, absent ballast 1321, the end of component 1300 which includes camera cover 410 will be heavier than the end which includes member 420. This will result in an inherent rotational bias around pivot 430. It can be desirable to reduce this rotational bias to reduce the amount of force need to move camera cover 410. To this end, balancing weight of component 1300 with ballast 1321 can reduce the rotational bias. Ballast 1321 can be achieved by increasing an area of member 420 as illustrated in FIG. 13, and/or by increasing a thickness of member 420, and/or by attaching a mass to member 420.

Ballast 1321 can also increase strength of magnetic coupling between magnet 752 and member 420 illustrated in FIGS. 7A and 7B. For example, if ballast 1321 is formed of ferromagnetic material, magnet 752 will apply more magnetic force to member 420. Alternatively, ballast 1321 can itself be a magnet, which will increase magnetic coupling strength with magnet 752.

Figure 14A:
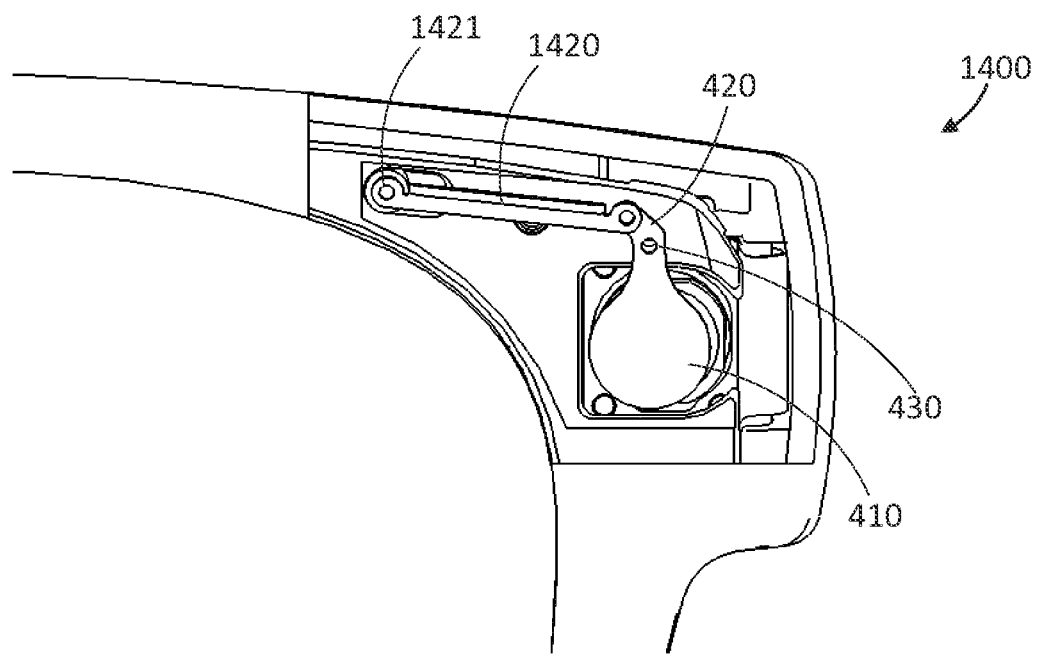
FIGS. 14A and 14B are respective front partial cutaway views of another camera privacy system implemented in a wearable device, in accordance with at least one implementation of the present systems and devices.
Figure 14B:
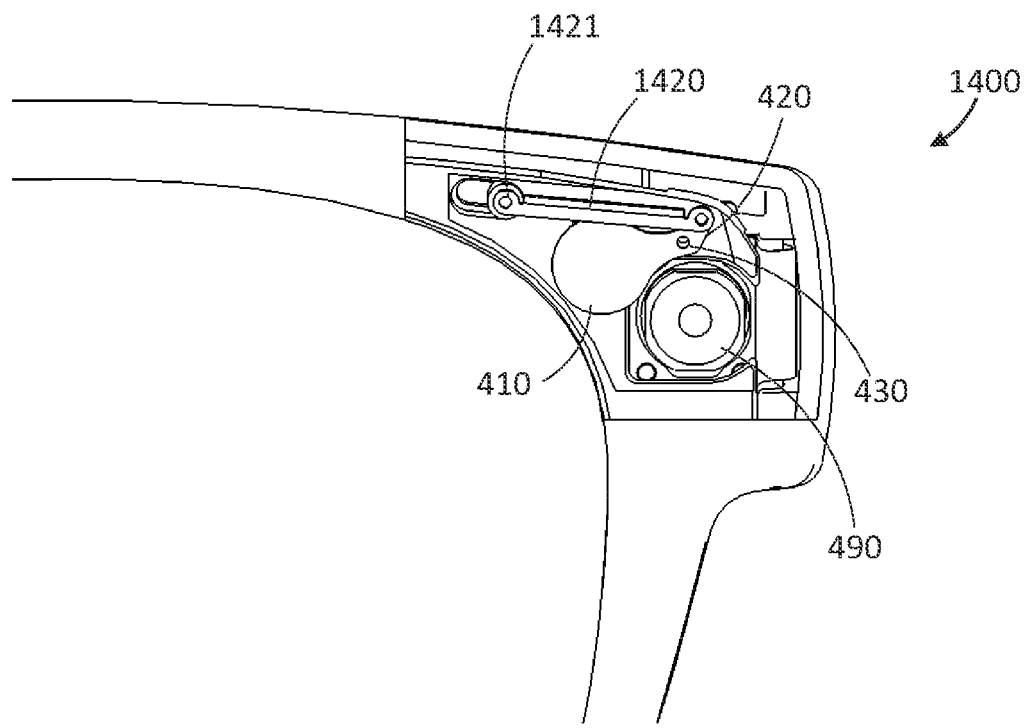

FIGS. 14A and 14B are respective front partial cutaway views of a portion of a wearable device 1400 which illustrates another exemplary camera privacy system. Wearable device 1400 can be similar in at least some respects to wearable device 400 illustrated in FIGS. 4A and 4B, and description of components of wearable device 400 can be applicable to similarly numbered components in wearable device 1400.

One difference between wearable device 1400 in FIGS. 14A and 14B, and wearable device 400 in FIGS. 4A and 4B, is that wearable device 1400 includes an additional member 1420. In wearable device 400, actuator 550 can be directly coupled to member 420 (e.g. directly mechanically coupled as in FIGS. 6A and 6B, or directly magnetically coupled as in FIGS. 7A and 7B). On the other hand, in wearable device 1400, member 420 can be indirectly coupled to an actuator 550 via the additional member 1420.

Camera cover 410 can be moved between a closed position as shown in FIG. 14A and an open position as shown in FIG. 14B. In particular, by moving member 1420, which in turn moves member 420, camera cover 410 rotates around pivot 430 between the open position and the closed position. Member 1420 can be coupled to an actuator at point 1421, such as actuator 550 described with reference to FIGS. 5A, 5B, 5C, 6A, 6B, 7A, and 7B, or actuators 1050a, 1050b, 1050c, 1050d, and 1050e described with reference to FIGS. 10A, 10B, 10C, 10D, and 10E. Member 1420 can be mechanically coupled to an actuator at point 1421, or could be magnetically coupled to an actuator at point 1421.

Figure 15A:
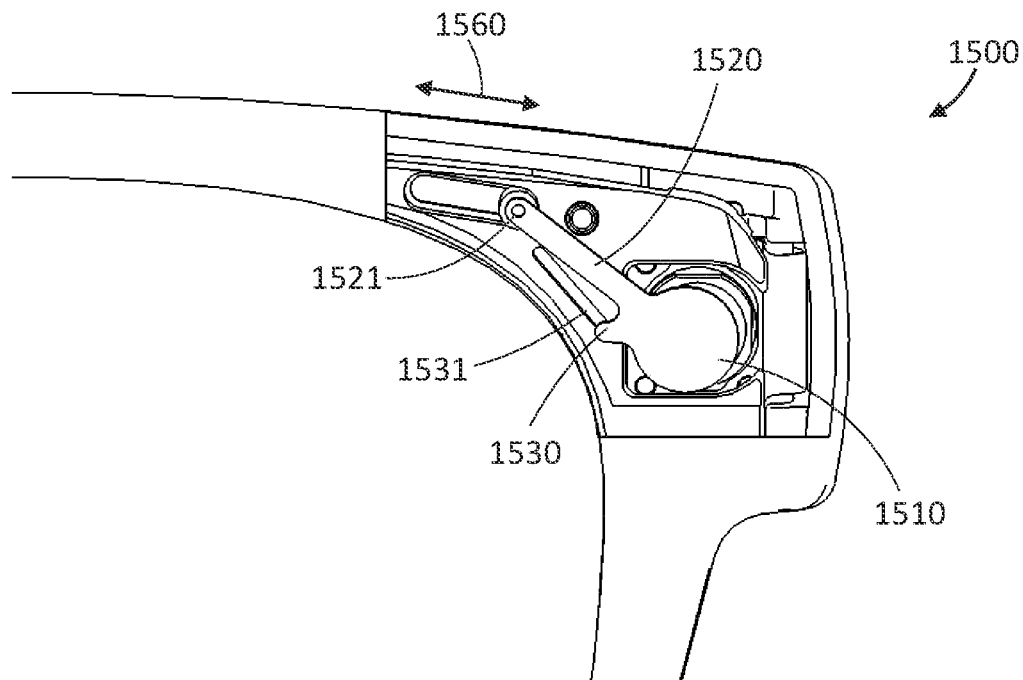
FIGS. 15A and 15B are respective front partial cutaway views of yet another camera privacy system implemented in a wearable device, in accordance with at least one implementation of the present systems and devices.
Figure 15B:
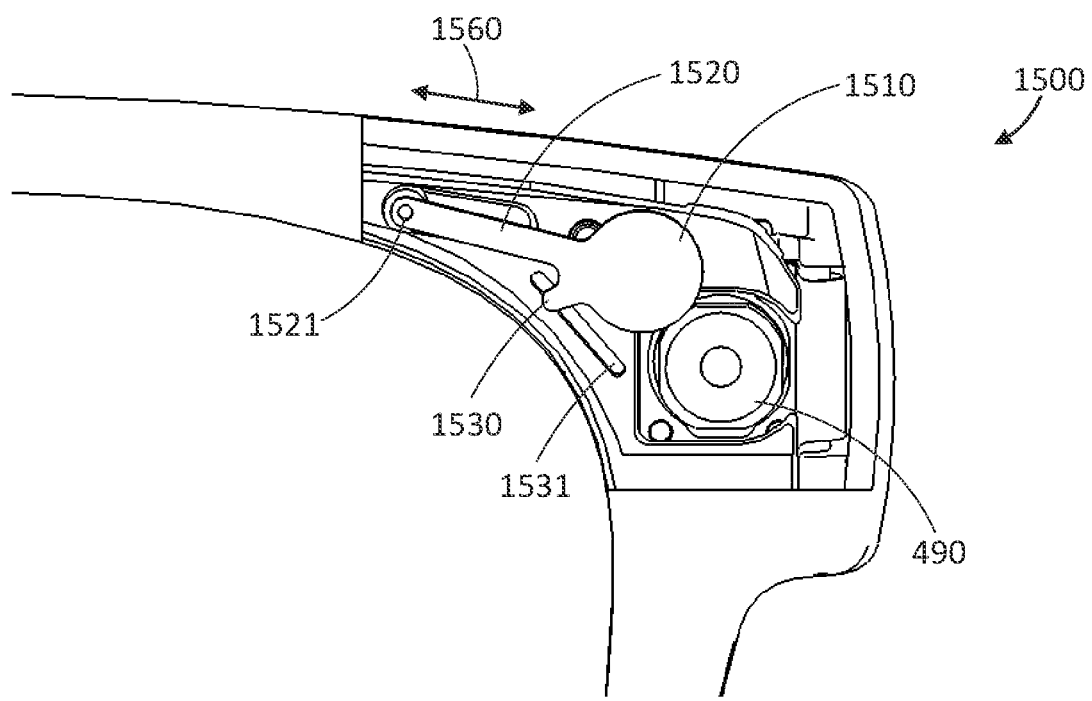

FIGS. 15A and 15B are respective front partial cutaway views of a portion of a wearable device 1500 which illustrates another exemplary camera privacy system. Wearable device 1500 can be similar in at least some respects to wearable device 400 illustrated in FIGS. 4A and 4B, and description of components of wearable device 400 can be applicable to similarly named components in wearable device 1500.

Wearable device 1500 can include a camera cover 1510 which can be similar to camera cover 410 discussed above. Camera cover 1510 can be in a closed position in which camera cover 1510 occludes a field of view of a camera 490, as illustrated in FIG. 15A. Camera cover 1510 can also be in an open position in which camera cover 1510 is at least partially out of the field of view of camera 490, illustrated in FIG. 15B. Camera cover 1510 can be coupled to an actuator at point 1521 by a member 1520. Member 1520 can be integrally formed with camera cover 1510, or could be a separate component coupled to camera cover 1510. At point 1521, member 1520 could be coupled to an actuator, such as actuator 550 described with reference to FIGS. 5A, 5B, 5C, 6A, 6B, 7A, and 7B, or actuators 1050a, 1050b, 1050c, 1050d, and 1050e described with reference to FIGS. 10A, 10B, 10C, 10D, and 10E. The actuator can be moved in a direction of a first axis 1560, which will push or pull member 1520, which in turn will slide camera cover 1510 between the closed position and the open position.

In the example of FIGS. 15A and 15B, wearable device 1500 can include a cam, which includes protrusion 1530 and guide 1531. Protrusion 1530 can protrude from camera cover 1510 or member 1520. Protrusion 1530 can be integrally formed with camera cover 1510 or member 1520, or could be a separate component coupled to camera cover 1510 or member 1520. Protrusion 1530 can interface with guide 1531; for example, guide 1531 could be a groove or ridge which interfaces with protrusion 1530. In this way, when member 1520 and camera cover 1510 are pulled or pushed by the actuator, guide 1531 can act on protrusion 1530 and cause camera cover 1510 to move in a direction which is non-parallel to first axis 1560.

In the example of FIGS. 15A and 15B, when transitioning from the closed position to the open position (i.e. from FIG. 15A to FIG. 15B), the actuator will pull member 1520 and camera cover 1510 in the direction of first axis 1560 generally to the left, and the cam including guide 1531 and protrusion 1530 will push camera cover 1510 to move in an upward direction. In the reverse, when transitioning from the open position to the closed position (i.e. from FIG. 15B to FIG. 15A), the actuator will push member 1520 and cam cover 1510 in the direction of the first axis 1560 generally to the right, and the cam including guide 1531 and protrusion 1530 will push camera cover 1510 to move in a downward direction.

Alternate cam systems to that shown in FIGS. 15A and 15B could be used. For example, guide 1531 could contact camera cover 1510 or member 1520 directly without the need for protrusion 1530. As another example, camera cover 1510 could rest against an interior surface of wearable device 1500, such that the interior surface will guide camera cover 1510 in a direction non-parallel to first axis 1560.

Figure 16A:
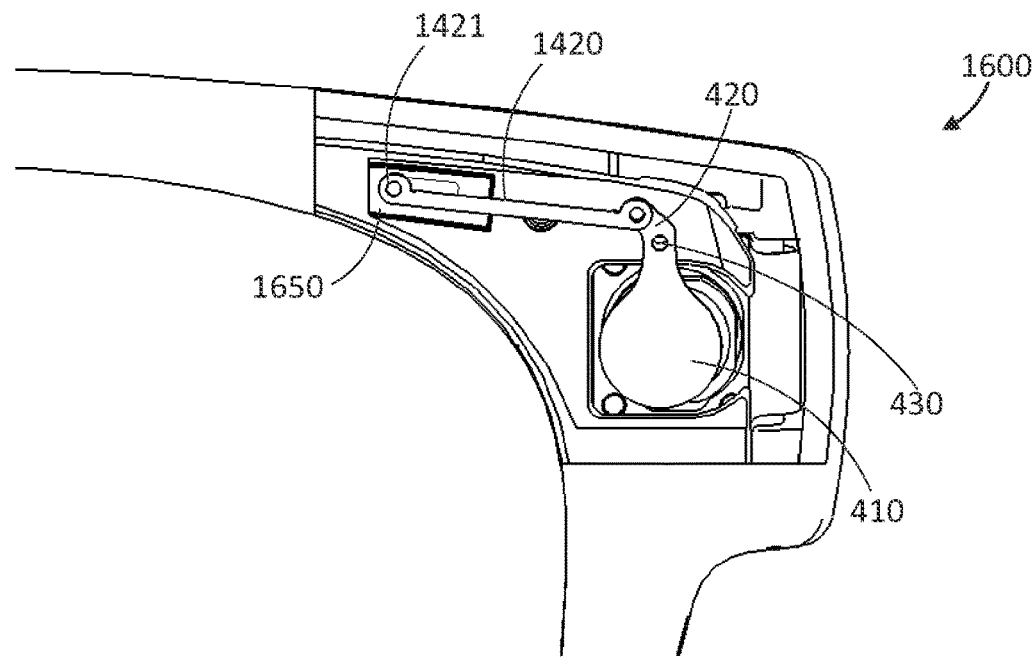
FIGS. 16A and 16B are respective front partial cutaway views of another camera privacy system implemented in a wearable device, which can include an actuator motor, in accordance with at least one implementation of the present systems and devices.
Figure 16B:
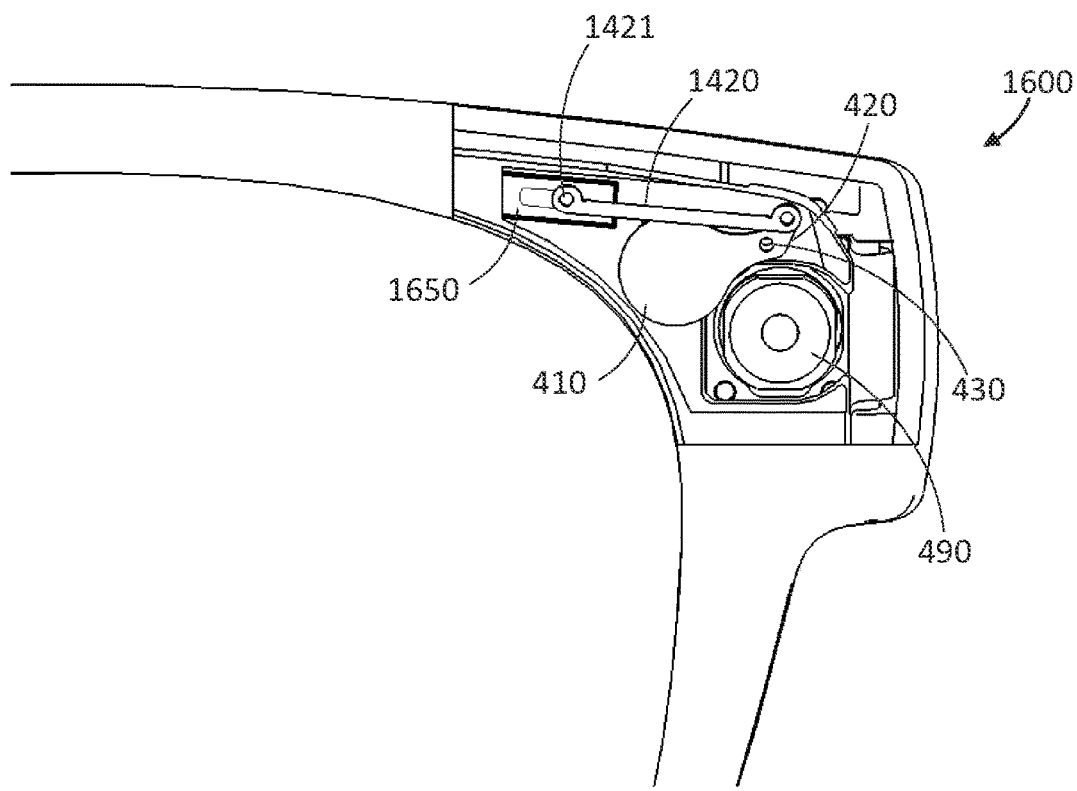

FIGS. 16A and 16B are respective front partial cutaway views of a wearable device 1600 which includes a camera privacy system which can be similar in at least some respects to wearable device 1400 discussed with reference to FIGS. 14A and 14B. Description of components of wearable device 1400 can be applicable to similarly numbered components of wearable device 1600.

One difference between wearable device 1600 and wearable device 1400 is that wearable device 1600 includes a motor 1650. Motor 1650 can for example be a piezoelectric actuator, which can be coupled to camera cover 410, such that motor 1650 can move camera cover 410 between the closed position and the open position. In the example of FIGS. 16A and 16B, motor 1650 is coupled to member 1420 and member 420, such that motor 1650 indirectly move camera cover 410. However, motor 1650 could also be implemented in any of the wearable devices described herein, such as wearable device 400 in FIGS. 4A and 4B, or wearable device 1500 in FIGS. 15A and 15B. For example, motor 1650 could be coupled to member 420 in wearable device 400, such that motor 1650 can move camera cover 410 between the closed position and the open position via member 420. As another example, motor 1650 could be coupled to member 1520 in wearable device 1500, such that motor 1650 can move camera cover 1510 between the closed position and the open position via member 1520.

Advantageously, motor 1650 can enable the camera privacy systems described herein to be actuated without mechanical effort by the user. Further, motor 1650 can be included within a water or dust resistant housing of wearable device, which eliminates the need to provide additional sealing for externally accessible actuators. However, actuators which are manually operated by a user have other advantages, as discussed above.

In any of the wearable devices described herein, it can be desirable for at least one processor of the wearable device to be aware of the position of a camera cover. For example, if at least one processor of the wearable device is aware that a camera cover is in a closed position, applications or functions which require camera functionality can be disabled. The user could be reminded to move the camera cover to the open position if use of such applications or functions is desired. The position of a camera cover could be determined in a number of ways as discussed below.

As one example, a camera could capture image data, and the at least one processor could analyze the image data to determine whether the camera cover is closed. If the brightness of the captured image data is very low, and/or if no meaningful features can be discerned from the image data, the at least one processor can determine that the camera cover is closed (or that the camera is inoperable in general, such as low-light environments). For the purposes of determining the position of a camera cover, resource consumption can be minimized by capturing image data of low quality, and/or by restricting analysis performed by the at least one processor to cursory or quick algorithms. For example, a camera could be run in a low-power mode, in which only a subset of sensors in the camera are active or monitored to limit the amount of data collected and processed. As another example, the at least one processor could do a simplified brightness detection algorithm, in which the captured data is analyzed to determine whether an average brightness or a maximum brightness of the captured image data exceeds a threshold. Such techniques could reduce the power consumed and the time required to determine the position of the camera cover.

However, to reduce the power consumed and the time required to determine the position of the camera cover further, it may be desirable to implement dedicated camera cover detection components. For example, an ambient light sensor could be positioned adjacent a camera, such that when a camera cover is in the closed position, the ambient light sensor is also covered by the camera cover. Data from the ambient light sensor can then be analyzed to determine the position of the camera cover.

Figure 17A:
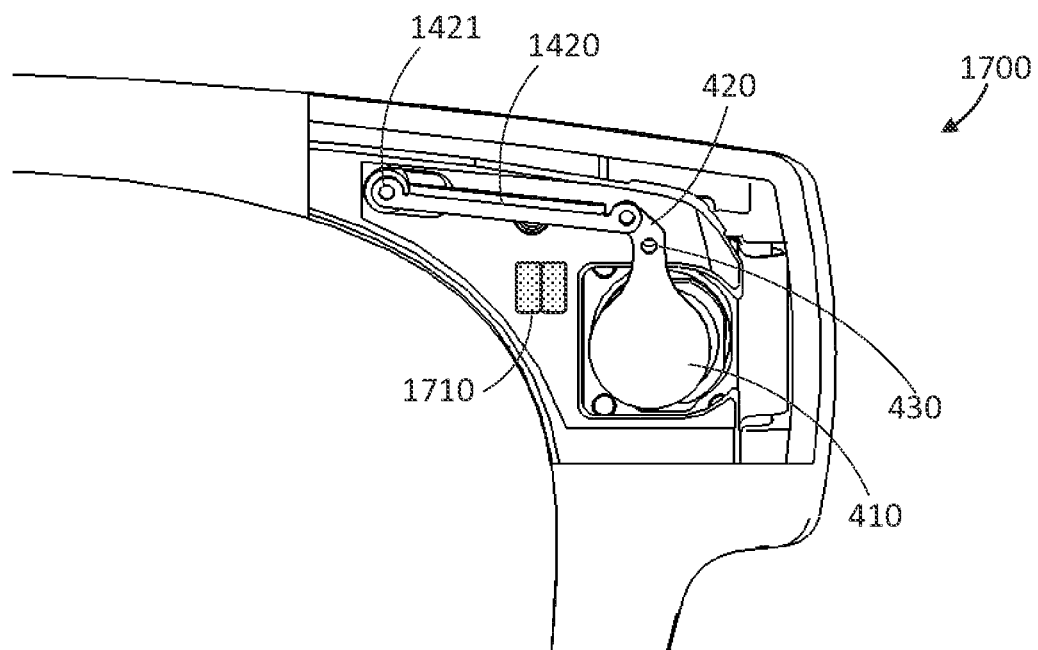
FIGS. 17A and 17B are respective front partial cutaway views of another camera privacy system implemented in a wearable device, which can include a position detector for a camera cover, in accordance with at least one implementation of the present systems and devices.
Figure 17B:
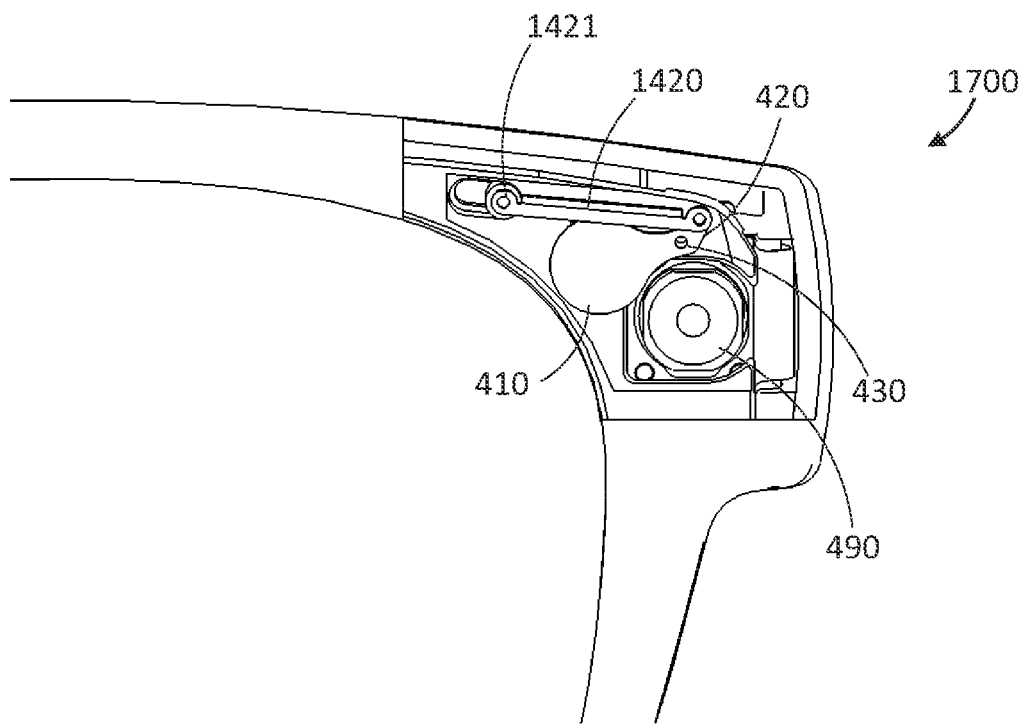

As another example, a proximity sensor could be positioned to detect any portion of the camera cover or the actuation components (such as connecting members). In this regard, FIGS. 17A and 17B are respective front partial cutaway views which illustrate an exemplary wearable device 1700. Wearable device 1700 can be similar in at least some respects to wearable device 1400 discussed with reference to FIGS. 14A and 14B. Description of components of wearable device 1400 can be applicable to similarly numbered components in wearable device 1700.

Wearable device 1700 includes a proximity sensor 1710. When camera cover 410 is in the closed position as illustrated in FIG. 17A, the proximity sensor 1710 may not detect any objects in the desired proximity, which can be interpreted by at least one processor of wearable device 1700 to mean that camera cover 410 is in the closed position. On the other hand, when camera cover 410 is in the open position illustrated in FIG. 17B, camera cover 410 may be in front of proximity sensor 1710, such that proximity sensor 1710 will detect an object in the desired proximity, which at least one processor of wearable device 170 may interpret to mean that camera cover 410 is in the open position.

With appropriate positioning of the proximity sensor, detection of the proximity of any given component coupled to the camera cover could indicate the position of the camera cover. Further, a proximity sensor to determine the position of a camera cover could be implemented in any of the camera privacy systems discussed herein, including for example wearable device 400 in FIGS. 4A and 4B, and wearable device 1500 in FIGS. 15A and 15B.

Figure 18A:
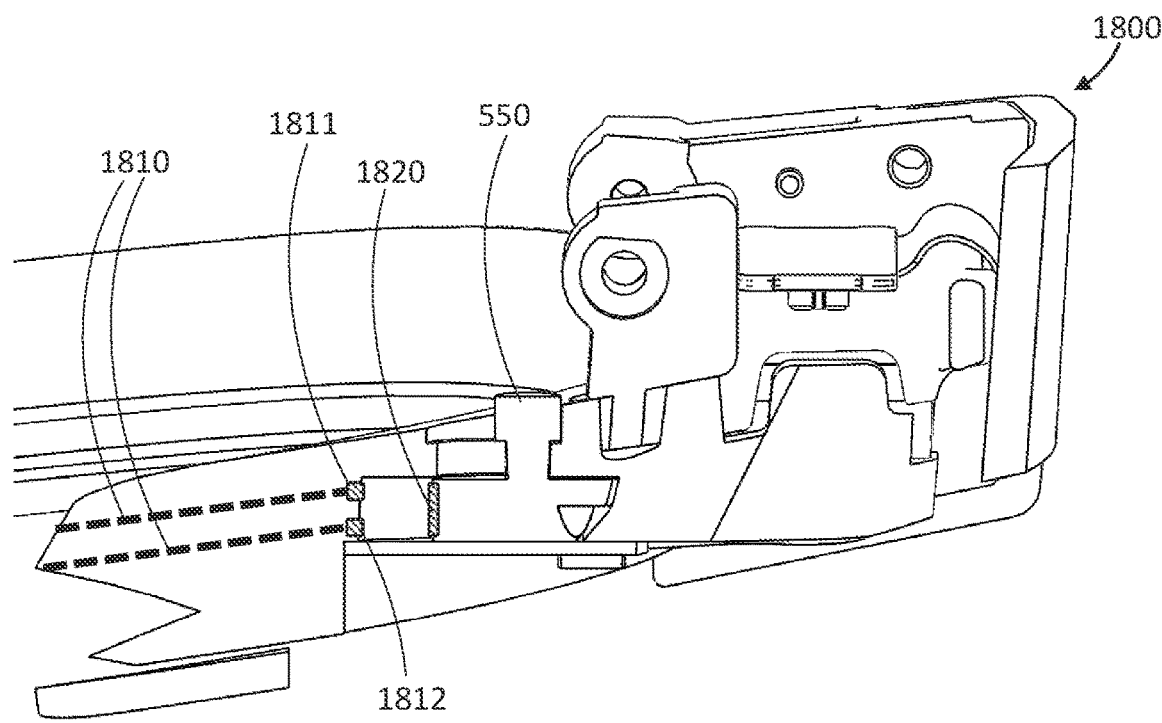
FIGS. 18A and 18B are respective top cutaway views which illustrate a detection circuit, in accordance with at least one implementation of the present systems and devices.
Figure 18B:
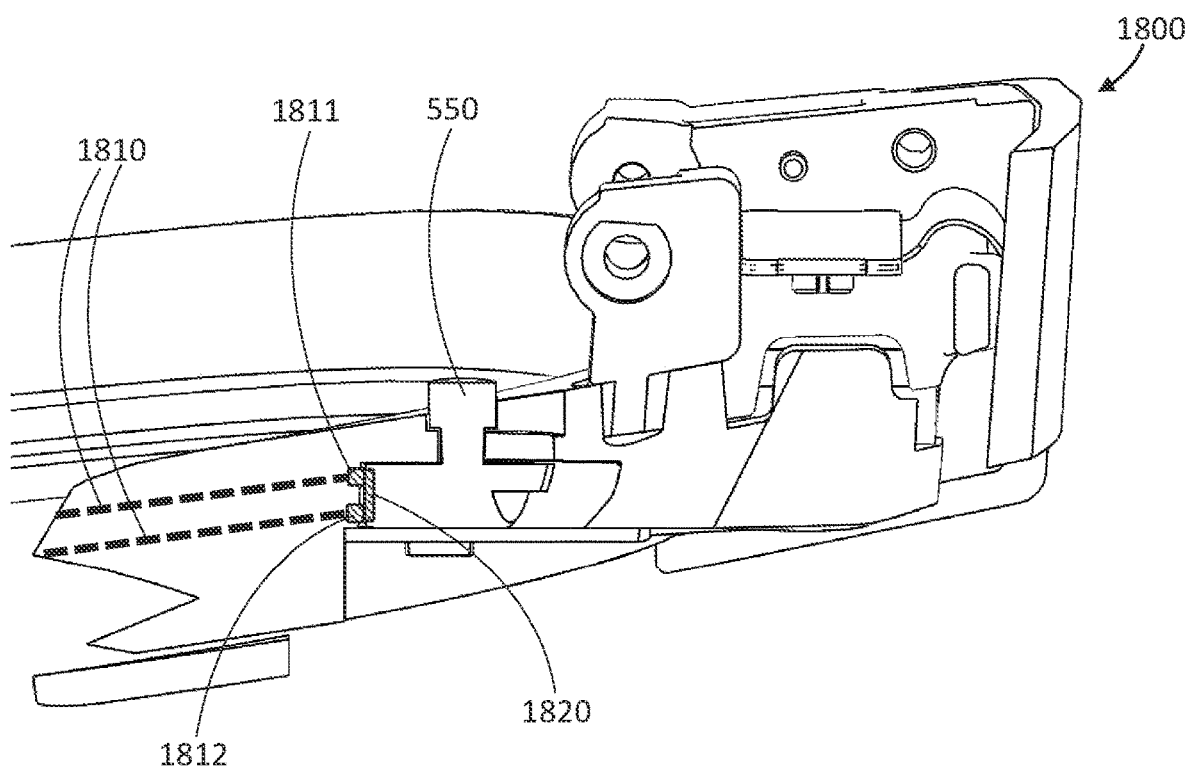

In other implementations, the position of an actuator can be detected to determine the position of the camera cover. For example, a detection circuit may be included which detects the position of an actuator. In this regard, FIGS. 18A and 18B are top cutaway views of an exemplary wearable device 1800, which can include an actuator 550, similar to that described with reference to FIGS. 5A, 5B, 5C, 6A, 6B, 7A, and 7B, or similar to actuators 1050*a*, 1050*b*, 1050*c*, 1050*d*, and 1050*e* described with reference to FIGS. 10A, 10B, 10C, 10D, and 10E.

Wearable device 1800 includes circuit 1810, which is coupled to a pair of electrical contacts 1811 and 1812, which are spatially separate from each other. Actuator 550 includes or is coupled to a conductive contact 1820. At least one processor of wearable device 1800 can monitor the status of circuit 1810, to determine the position of actuator 550, and to thereby interpret the position of a camera cover coupled to actuator 550. When actuator 550 is in a first position illustrated in FIG. 18A, circuit 1810 will be open. At least one processor can determine that the actuator is in the first position, and consequently interpret the position of a camera cover (closed, in this example). When actuator 550 is in a second position illustrated in FIG. 18B, contact 1820 will bridge contacts 1811 and 1812, thereby closing circuit 1810. At least one processor can determine that the actuator is in the second position, and consequently interpret the position of a camera cover (open, in this example).

The correlation between the status of circuit 1810, the position of actuator 550, and the position of the camera cover described above are merely exemplary, and could be different in different applications. The specific correlation will depend on the geometry and positioning of the components of a given wearable device.

In implementations which use magnetic coupling, a magnet sensor, such as a Hall-effect sensor, can be used to detect the position of the actuator or magnetized component, from which the position of a camera cover can be determined. In this regard, FIGS. 19A and 19B are top cutaway views of an exemplary wearable device 1900, which can include an actuator 550, similar to that described with reference to FIGS. 7A and 7B.

Wearable device 1900 includes circuit 1910, which is coupled to a magnetic sensor 1920. Actuator 550 includes or is coupled to a magnet 752. At least one processor of wearable device 1900 can monitor the status of the magnetic sensor 1920 via circuit 1910, to determine the position of magnet 752, and to thereby interpret the position of a camera cover coupled to magnet 752. When actuator 550 is in a first position illustrated in FIG. 19A, magnet sensor 1920 is distant from magnet 752, and thus will not detect magnet 752. From this, at least one processor can determine that the actuator 550 is in the first position, and consequently interpret the position of a camera cover (closed, in this example). When actuator 550 is in a second position illustrated in FIG. 19B, magnet sensor 1920 is close to magnet 752, and thus will detect magnet 752. From this, the at least one processor can determine that the actuator 550 is in the second position, and consequently interpret the position of a camera cover (open, in this example).

The correlation between the position of magnet sensor 1920, the position of magnet 752, and the position of the camera cover described above are merely exemplary, and could be different in different applications. The specific correlation will depend on the geometry and positioning of the components of a given wearable device. Further, in cases where other portions of the wearable device are magnetic (such as member 420 as mentioned above), a magnet sensor could be positioned to detect the position of such components, from which a position of the camera cover can be interpreted.

Figure 19A:
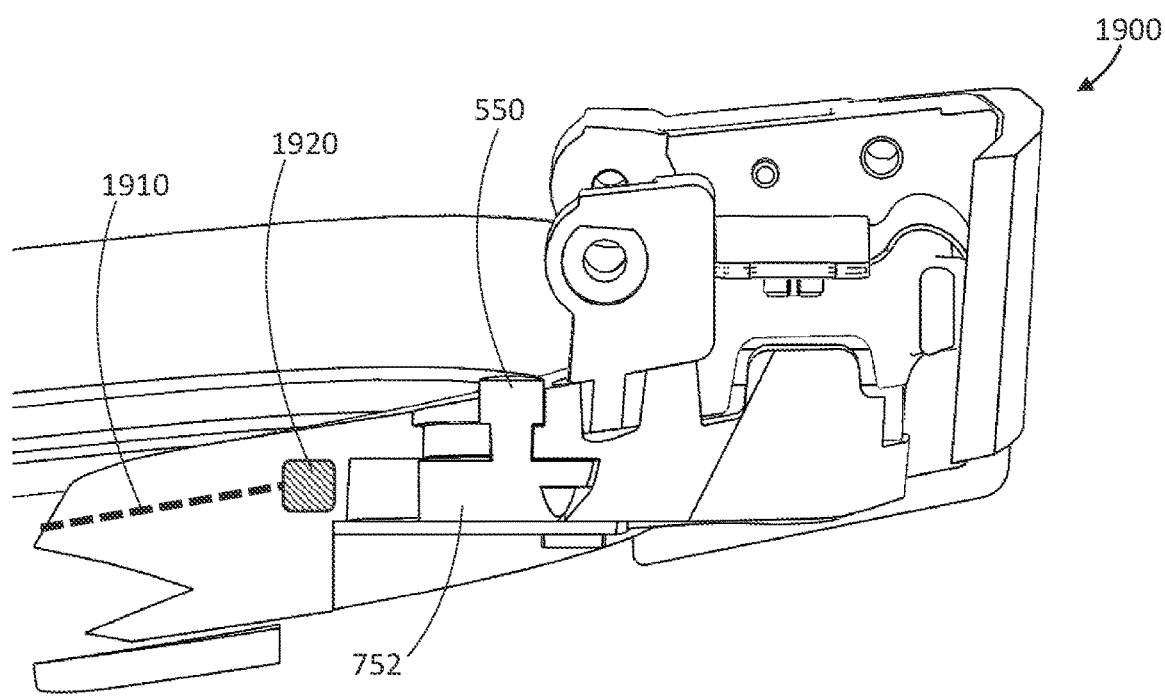
FIGS. 19A and 19B are respective top cutaway views which illustrate a detection circuit and sensor, in accordance with at least one implementation of the present systems and devices.
Figure 19B:
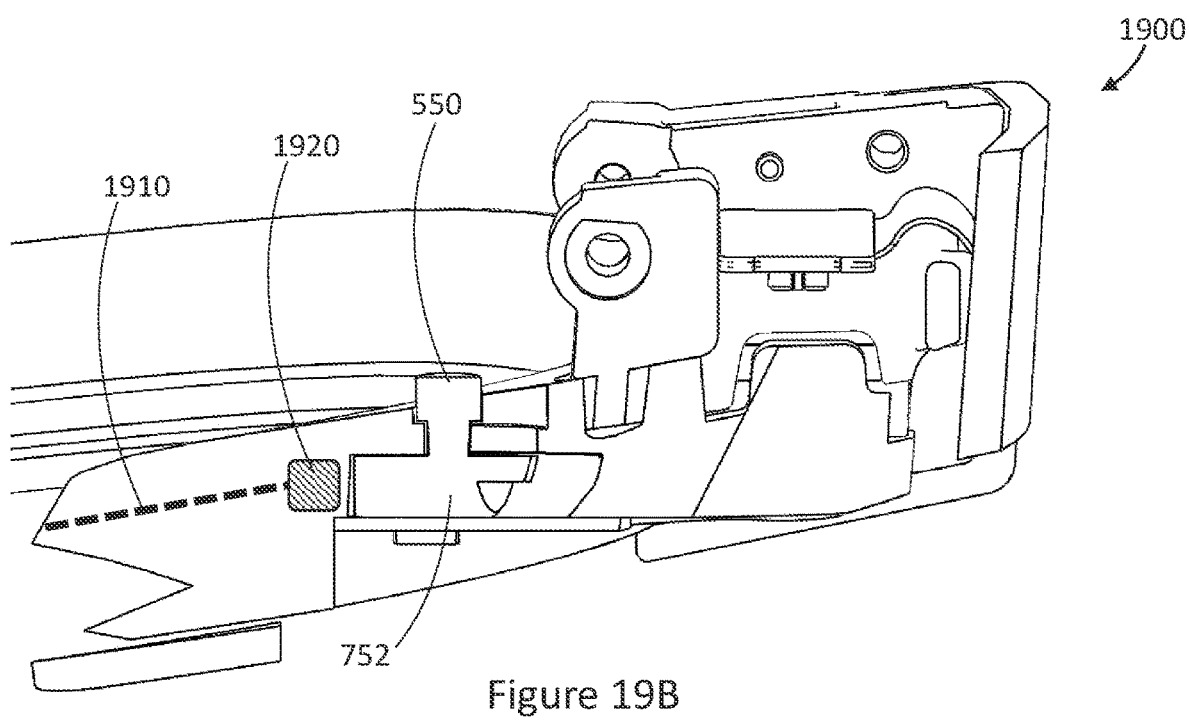
Figure 20:
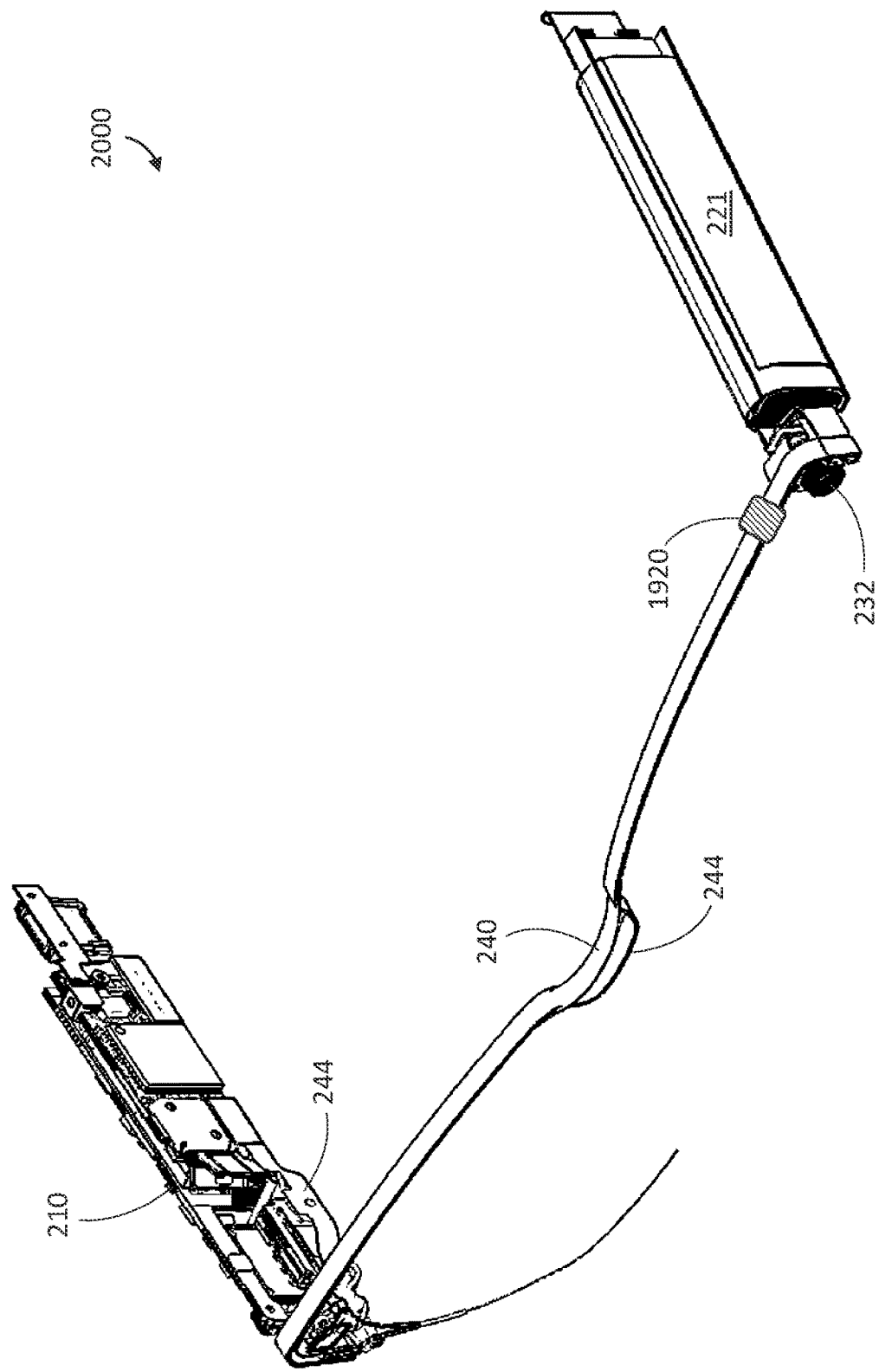
FIG. 20 is an isometric exposed view of a wearable device including sets of electrically conductive pathways, in accordance with at least one implementation of the present systems and devices.

Detection circuits, such as circuit 1810 in FIGS. 18A and 18B, and circuit 1920 in FIGS. 19A and 19B, do not necessarily need to be run through a wearable device on a dedicated set of electrical pathways. Instead, such circuits can be embedded with other sets of electrical pathways in a wearable device. In this regard, FIG. 20 is an isometric exposed view of a wearable device 2000, which can be similar in at least some respects to any of the other wearable devices described herein. Description of components anywhere in this disclosure can be applicable to similarly numbered and similarly named components in FIG. 20.

FIG. 20 is an exposed view in that housing and support structure components of wearable device 2000 are not shown, so that the discussed features of wearable device 2000 are more clear. FIG. 20 shows a first set of electrically conductive pathways 240 which are electrically coupled a battery 221 to electrical components in a first arm 210 of wearable device 2000. FIG. 20 also shows a second set of electrically conductive pathways 244 which electrically couple electrical components in first arm 210 to a camera 232. A magnet sensor 1920 (or other detection element, like pairs of electrical contacts) can be electrically coupled to the second set of electrically conductive pathways 244. In some implementations, magnet sensor 1920 (or similar detection element) could be mounted to the second set of electrically conductive pathways 244, to make wearable device 2000 easier to assemble.

Throughout this specification, a variety of camera covers and related features are described, such as with reference to FIGS. 4A, 4B, 8A, 8B, 8C, 9, 11A, 11B, 12A, 12B, 13, 14A, 14B, 15A, 15B, 17A, and 17B. Further, a variety of actuators and related features are described, such as with reference to FIGS. 5A, 5B, 5C, 6A, 6B, 7A, 7B, 10A, 10B, 10C, 10D, 10E, 16A, 16B, 18A, 18B, 19A, 19B, and 20. In general, unless context clearly dictates otherwise, it is within the scope of the present disclosure to combine any described actuator and related features with any described camera cover and related features.

In some implementations, one or more optical fiber(s) may be used to guide light signals along some of the paths illustrated herein.

The wearable devices described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The wearable devices described herein may include one or more on-board power sources (e.g., one or more battery (ies)), a wireless transceiver for sending/receiving wireless communications, and/or a tethered connector port for coupling to a computer and/or charging the one or more on-board power source(s).

The wearable devices described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

The various embodiments described above can be combined to provide further embodiments. To the extent that they are not inconsistent with the specific teachings and definitions herein, each of the following are incorporated by reference herein in their entirety: U.S. Provisional Patent Application No. 62/862,355, U.S. patent application Ser. No. 16/025,820, U.S. patent application Ser. No. 15/145,576, U.S. patent application Ser. No. 15/807,856, U.S. Provisional Patent Application No. 62/754,339, U.S. Provisional Patent Application Ser. No. 62/782,918, U.S. Provisional Patent Application Ser. No. 62/789,908, U.S. Provisional Patent Application Ser. No. 62/845,956, U.S. Provisional Patent Application Ser. No. 62/791,514, U.S. Provisional Patent Application Ser. No. 62/791,514, U.S. Provisional Patent Application No. 62/890,269, U.S. Provisional Patent Application Ser. No. 62/438,725, U.S. Non-Provisional patent application Ser. No. 15/848,265 (U.S. Publication Number 2018/0180885), U.S. Non-Provisional patent application Ser. No. 15/848,388 (U.S. Publication Number 2018/0180886), U.S. Provisional Patent Application Ser. No. 62/450,218, U.S. Non-Provisional patent application Ser. No. 15/852,188 (U.S. Publication Number 2018/0210215), U.S. Non-Provisional patent application Ser. No. 15/852,282, (U.S. Publication Number 2018/0210213), U.S. Non-Provisional patent application Ser. No. 15/852,205 (U.S. Publication Number 2018/0210216), U.S. patent application Ser. No. 16/203,278, U.S. patent application Ser. No. 16/216,925, U.S. patent application Ser. No. 16/231,019, U.S. patent application Ser. No. 16/231,328, U.S. Provisional Patent Application No. 62/890,269, U.S. Non-Provisional patent application Ser. No. 15/661,415, U.S. Non-Provisional patent application Ser. No. 16/047,852, U.S. Provisional Patent Application No. 62/913,825, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable device comprising:
   a support structure including a housing;
   a camera carried by the support structure;
   a camera cover carried by the support structure, the camera cover distinct from the camera and movable between a first position and a second position relative to the camera, wherein in the first position the camera cover occludes a field of view of the camera, and in the second position the camera cover is at least partially out of the field of view of the camera; and
   a barrier disposed in the housing between an environment external to the housing and the camera and camera cover.

2. The wearable device of claim 1, wherein the camera cover is rotatable about a pivot.

3. The wearable device of claim 1, wherein the barrier is further disposed in the housing so as to seal the camera and camera cover in the housing.

4. The wearable device of claim 1, further comprising an actuator coupled to the camera cover.

5. The wearable device of claim 4, wherein the actuator is a sliding actuator slidable along a first axis between a third position and a fourth position, wherein in the third position the actuator holds the camera cover in the first position, and in the fourth position the actuator holds the camera cover in the second position.

6. The wearable device of claim 5, further comprising a cam to translate the camera cover in a direction non-parallel to the first axis when the actuator transitions between the third position and the fourth position.

7. The wearable device of claim 4, wherein the actuator is magnetically coupled to the camera cover.

8. The wearable device of claim 4, wherein the actuator comprises a mechanical actuator which is operated by mechanical force applied by a user.

9. The wearable device of claim 4, wherein the actuator includes a motor.

10. The wearable device of claim 4, wherein the camera and the camera cover are disposed on a first surface of a front frame and the actuator is disposed on a second surface of the front frame, the second surface being different from the first surface.

11. The wearable device of claim 1, further comprising a bias member which biases the camera cover towards either the first position or the second position.

12. The wearable device of claim 1, further comprising at least one restrain member which limits a range of motion of the camera cover.

13. The wearable device of claim 1, wherein the support structure comprises:
   a first arm to be positioned on a first side of a head of a user;
   a second arm to be positioned on a second side of the head of the user opposite the first side; and
   a front frame coupled to the first arm and the second arm and configured to carry an eyeglass lens, the front frame to be positioned on a front of the head of the user.

14. The wearable device of claim 13, wherein the camera and the camera cover are disposed on the front frame.

15. The wearable device of claim 1, further comprising a detection circuit to determine whether the camera cover is in the first position or the second position.

16. The wearable device of claim 15, wherein an actuator is magnetically coupled to the camera cover, and the detection circuit comprises a magnet sensor to determine whether the camera cover is in the first position or the second position.

17. A head-mounted display (HMD) device, comprising:
   an arm; and
   a frame coupled to the arm, the frame comprising:
   a housing;
   a display;
   a camera;

a camera cover distinct from the camera and movable between a first position and a second position relative to the camera to at least partially occlude a field of view of the camera, and in the second position the camera cover is at least partially out of the field of view of the camera; and a barrier disposed in the housing between an environment external to the housing and the camera and camera cover.

18. The HMD device of claim 17, wherein the camera cover is magnetically secured in one of the first position and the second position.

19. The HMD device of claim 17, further comprising:
an actuator to assist moving the camera cover between the first position and the second position.

20. A method, comprising:
receiving an input signal at an actuator of a head-mounted display (HMD) device; and in response to the input signal, moving a camera cover of the HMD device from a first position to a second position to at least partially occlude a field of view of a camera, the camera cover distinct from the camera, wherein the HMD device includes a barrier disposed in a housing of the HMD device between an environment external to the housing and the camera and camera cover.

* * * * *